United States Patent
Minamisawa

(10) Patent No.: US 11,579,464 B2
(45) Date of Patent: Feb. 14, 2023

(54) OPTICAL UNIT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 157 days.

(21) Appl. No.: 17/271,578

(22) PCT Filed: Aug. 7, 2019

(86) PCT No.: PCT/JP2019/031239
§ 371 (c)(1),
(2) Date: Feb. 25, 2021

(87) PCT Pub. No.: WO2020/045012
PCT Pub. Date: Mar. 5, 2020

(65) Prior Publication Data
US 2021/0349329 A1 Nov. 11, 2021

(30) Foreign Application Priority Data

Aug. 31, 2018 (JP) .............................. JP2018-162975

(51) Int. Cl.
*G02B 27/64* (2006.01)
*G03B 17/12* (2021.01)
*G03B 5/00* (2021.01)

(52) U.S. Cl.
CPC ............. *G02B 27/646* (2013.01); *G03B 5/00* (2013.01); *G03B 17/12* (2013.01); *G03B 2205/0007* (2013.01); *G03B 2205/0053* (2013.01)

(58) Field of Classification Search
None
See application file for complete search history.

(56) References Cited

U.S. PATENT DOCUMENTS

| 8,711,236 B2 | 4/2014 | Shimizu |
| 10,110,816 B2 | 10/2018 | Asakawa |

(Continued)

FOREIGN PATENT DOCUMENTS

| JP | 2010266789 | 11/2010 |
| JP | 2011113009 | 6/2011 |

(Continued)

OTHER PUBLICATIONS

"International Search Report (Form PCT/ISA/210)"of PCT/JP2019/031239, dated Nov. 12, 2019, with English translation thereof, pp. 1-4.

*Primary Examiner* — Derek S. Chapel
(74) *Attorney, Agent, or Firm* — JCIPRNET

(57) ABSTRACT

An optical unit is provided and includes: a movable body having an optical module; a fixed body; a rolling support mechanism which supports the movable body rotatably around the optical axis of the optical module with respect to the fixed body; and a rolling drive mechanism which turn the movable body around the optical axis. The rolling support mechanism includes: at least one pair of protruded parts which protrude from one of the movable body and the fixed body towards the other thereof and which are disposed at positions facing each other with the optical axis interposed therebetween in a direction intersecting the optical axis, and an elastic member whose one end part is attached to the protruded part and an other end part is attached to the other of the movable body and the fixed body, and which turnably support the movable body around the optical axis.

15 Claims, 17 Drawing Sheets

(56) References Cited

U.S. PATENT DOCUMENTS

| | | | |
|---|---|---|---|
| 10,928,607 B2 | 2/2021 | Shin | |
| 2008/0247063 A1* | 10/2008 | Otsuki | G02B 7/04 |
| | | | 359/811 |
| 2013/0121672 A1 | 5/2013 | Shikama et al. | |
| 2018/0335603 A1* | 11/2018 | Hu | H02K 41/0356 |
| 2021/0141188 A1 | 5/2021 | Shin | |
| 2021/0389550 A1* | 12/2021 | Minamisawa | G02B 27/646 |
| 2022/0236582 A1* | 7/2022 | Minamisawa | H04N 5/232 |

FOREIGN PATENT DOCUMENTS

| | | |
|---|---|---|
| JP | 2013083692 | 5/2013 |
| JP | 2013125080 | 6/2013 |
| JP | 2015082072 | 4/2015 |
| JP | 2017003956 | 1/2017 |
| JP | 2017215550 | 12/2017 |
| JP | 2018077395 | 5/2018 |
| WO | 2017135649 | 8/2017 |

* cited by examiner

OPTICAL UNIT

CROSS-REFERENCE TO RELATED APPLICATION

This application is a 371 application of the international PCT application serial no. PCT/JP2019/031239, filed on Aug. 7, 2019, which claims the priority benefits of Japan application no. 2018-162975 filed on Aug. 31, 2018. The entirety of each of the above-mentioned patent applications is hereby incorporated by reference herein and made a part of this specification.

TECHNICAL FIELD

The present invention relates to an optical unit with a shake correction function.

BACKGROUND ART

An optical unit is, as an example, structured of a movable body having an optical module and a fixed body which displaceably holds the movable body. For example, in Patent Literature 1, a first holding body 2 is supported by a second holding body 3 by a plate spring 8 and a plate spring 9 so as to be movable in an optical axis direction, and the second holding body 3 is supported by a fixed body 4 so as to be movable in a direction substantially perpendicular to the optical axis direction by a plurality of wires 10.

CITATION LIST

Patent Literature

[Patent Literature 1]: Japanese Patent Laid-Open No. 2011-113009

SUMMARY OF THE INVENTION

Problems to be Solved by the Invention

In the optical unit, in order to prevent buckling of the wire 10, when a force is applied to a movable portion such as the second holding body to a lower direction, a wire fixing part 8d is elastically deformed toward the lower direction. An abutting part 21 is provided on a lower side with respect to the second holding body 3. When the wire fixing part 8d is deformed toward the lower direction, the second holding body 3 is also displaced to the lower side. In this case, the second holding body 3 displaced to the lower side is contacted with the abutting part 21 and is supported by the abutting part 21. As a result, the buckling of the wire fixing part 8d which is a plate spring is suppressed.

However, in this structure, when the impact is applied to the optical unit, a force applied to the wire fixing part 8d may include, in addition to a force to the lower side to which the wire fixing part 8d is elastically deformable, a force to an upper side, a lateral side or the like, or in their combined direction. Therefore, a force may be applied to the wire fixing part 8d in a direction other than an elastically deformable direction and thus, deformation which is not assumed may occur. As a result, a position and a posture of the movable body, i.e., the optical module is deviated with respect to the fixed body and thus, optical accuracy of the optical module may be reduced.

In view of the problem described above, an objective of the present invention is to provide an optical unit in which deformation of an elastic member disposed between the movable body and the fixed body is considered.

Means to Solve the Problems

To solve the above-mentioned problem, the present invention provides an optical unit including a movable body having an optical module, a fixed body, a rolling support mechanism which turnably supports the movable body around an optical axis of the optical module with respect to the fixed body, and a rolling drive mechanism structured to turn the movable body around the optical axis. The rolling support mechanism includes at least a pair of protruded parts which are protruded from one of the movable body and the fixed body toward the other of the movable body and the fixed body and are disposed at positions facing each other with the optical axis interposed therebetween in a direction intersecting the optical axis, and an elastic member whose one end part is attached to the protruded part and the other end part of the elastic member is attached to the other of the movable body and the fixed body, and the elastic member turnably supporting the movable body around the optical axis, and at least the pair of the protruded parts restricts a shake of the movable body by contacting with the other of the movable body and the fixed body.

According to this embodiment, the rolling support mechanism includes at least a pair of protruded parts which are protruded from one of the movable body and the fixed body toward the other of the movable body and the fixed body and are disposed at positions facing each other with the optical axis interposed therebetween in a direction intersecting the optical axis, and an elastic member whose one end part is attached to the protruded part and the other end part of the elastic member is attached to the other of the movable body and the fixed body, and the elastic member turnably supporting the movable body around the optical axis, and at least the pair of the protruded parts restricts a shake of the movable body by contacting with the other of the movable body and the fixed body. Therefore, a shake of the movable body can be restricted by the protruded part to which the elastic member is attached.

In other words, an attaching part for the elastic member restricts a shake of the movable body and thus, the shake of the movable body can be restricted at a position near to the elastic member and unintended deformation of the elastic member can be reduced. As a result, optical accuracy of the optical module can be maintained.

An optical unit in accordance with the present invention includes a movable body having an optical module, a fixed body, a rolling support mechanism which turnably supports the movable body around an optical axis of the optical module with respect to the fixed body, and a rolling drive mechanism structured to turn the movable body around the optical axis. The rolling support mechanism includes a plurality of protruded parts which are protruded from one of the movable body and the fixed body toward the other of the movable body and the fixed body and are disposed at rotationally symmetrical positions at equal intervals in a direction around the optical axis, and an elastic member whose one end part is attached to the protruded part and the other end part of the elastic member is attached to the other of the movable body and the fixed body, and the elastic member turnably supporting the movable body around the optical axis, and the protruded part restricts a shake of the movable body by contacting with the other of the movable body and the fixed body.

According to this embodiment, operations and effects similar to the above-mentioned embodiment can be obtained.

In the optical unit in accordance with the present invention, it is characterized in that the elastic member is structured as a plate spring and the elastic member is disposed between the movable body and the fixed body so that a plate thickness direction of the plate spring is directed in a direction around optical axis.

In the expression that "the elastic member is disposed so that a plate thickness direction of the plate spring is directed in a direction around optical axis", the phrase of "a plate thickness direction is directed in a direction around optical axis" does not require in the present specification that a plate thickness direction is strictly directed in a direction around optical axis. In other words, the direction has an allowance in a range that a function turnably supporting the optical module around the optical axis is not unstable.

According to this embodiment, the elastic member is structured as a plate spring, and the elastic member is disposed between the movable body and the fixed body so that a plate thickness direction of the plate spring is directed in a direction around optical axis. In other words, a direction of a plate face of the plate spring is a direction going to the optical axis. According to this structure, the plate spring which is an elastic member is capable of smoothly deforming in a turning direction around the optical axis in a state that the movable body is surely supported so as not to be accidentally displaced in the optical axis direction and in a direction intersecting the optical axis which are different from the turning direction. Therefore, when the movable body is turned around the optical axis, smooth and balanced turning can be realized.

In the optical unit in accordance with the present invention, it is characterized in that the elastic member is provided with a first portion which is extended in a direction of the optical axis, and a second portion which is disposed at a distance from the first portion in a direction intersecting the direction of the optical axis and is extended in the direction of the optical axis, and the elastic member is formed in a "U"-shape.

According to this embodiment, effects similar to the operations and effects in the respective embodiments can be obtained.

In the optical unit in accordance with the present invention, it is characterized in that the rolling support mechanism includes a receiving part which receives the protruded part in the other of the movable body and the fixed body and, when a direction passing the protruded part and the receiving part in a direction intersecting the optical axis is defined as a first axial line direction, and a direction intersecting the optical axis and the first axial line direction is defined as a second axial line direction, in the first axial line direction, the pair or the plurality of the protruded parts is provided with a first restricted part, and the receiving part corresponding to the protruded part is provided with a first restriction part at a distance from the first restricted part.

According to this embodiment, in the first axial line direction, the pair or the plurality of the protruded parts is provided with a first restricted part, and the receiving part corresponding to the protruded part is provided with a first restriction part at a distance from the first restricted part. Therefore, the movable body is displaced in the first axial line direction with respect to the fixed body and, when the first restricted part is contacted with the first restriction part, the shake in the first axial line direction of the movable body can be restricted. As a result, unintended deformation of the elastic member in the first axial line direction can be reduced and performance of the optical module can be maintained.

In the optical unit in accordance with the present invention, it is characterized in that the first restricted part is formed in a shape in which a distance between the first restricted part and the first restriction part is widened from a center portion in the second axial line direction toward both end parts in the second axial line direction.

According to this embodiment, the first restricted part is formed in a shape in which a distance between the first restricted part and the first restriction part is widened from a center portion in the second axial line direction toward both end parts in the second axial line direction and thus, when the movable body is turned in the direction around optical axis, the movable body can be restrained from interfering with the fixed body.

In the optical unit in accordance with the present invention, it is characterized in that the first restricted part is formed in a shape along a turning locus of the movable body around the optical axis.

According to this embodiment, the first restricted part is formed in a shape along a turning locus of the movable body around the optical axis and thus, when the movable body is turned in the direction around optical axis, interference of the movable body with the fixed body can be surely reduced.

In the optical unit in accordance with the present invention, it is characterized in that the first restricted part is formed in a shape along a tangent line with respect to a turning locus of the movable body around the optical axis.

According to this embodiment, the first restricted part is formed in a shape along a tangent line with respect to a turning locus of the movable body around the optical axis and thus, when the movable body is turned in the direction around optical axis, interference of the movable body with the fixed body can be surely reduced.

In the optical unit in accordance with the present invention, it is characterized in that a distance in the first axial line direction between the first restricted part and the first restriction part is smaller than a distance between the first portion and the second portion of the elastic member.

According to this embodiment, in the first axial line direction, a distance between the first restricted part and the first restriction part is smaller than a distance between the first portion and the second portion of the elastic member. Therefore, when the movable body is displaced to the fixed body side in the first axial line direction, the first restricted part is contacted with the first restriction part before the first portion and the second portion of the elastic member are contacted with each other. As a result, deformation of the elastic member more than a distance between the first restricted part and the first restriction part can be prevented.

In this case, for example, when a distance between the first restricted part and the first restriction part is set within an elastic deformation region of the elastic member in the first axial line direction, plastic deformation of the elastic member can be prevented.

In the optical unit in accordance with the present invention, it is characterized in that, in the second axial line direction, the protruded part is provided with a second restricted part and the receiving part is provided with a second restriction part at a distance from the second restricted part.

According to this embodiment, in the second axial line direction, the protruded part is provided with a second restricted part and the receiving part is provided with a second restriction part at a distance from the second restricted part. Therefore, in a case that the movable body is displaced with respect to the fixed body in the second axial line direction, more specifically, displaced around the optical axis, when the second restricted part is contacted with the second restriction part, the shake in the second axial line direction of the movable body can be restricted. As a result, unintended deformation in the second axial line direction of the elastic member can be reduced and optical accuracy of the optical module can be maintained.

In the optical unit in accordance with the present invention, it is characterized in that two pairs of the second restricted parts and the second restriction parts are provided so as to be disposed with a space therebetween in the second axial line direction.

According to this embodiment, two pairs of the second restricted parts and the second restriction parts are provided so as to be disposed with a space therebetween in the second axial line direction. Therefore, when the movable body is displaced in the direction around the optical axis with respect to the fixed body, one pair of the second restricted part and the restriction part is capable of restricting displacement of the movable body more than a predetermined amount, in other words, more than a distance between the second restricted part and the second restriction part, to the first direction in the direction around optical axis, and the other pair of the second restricted part and the second restriction part is capable of restricting displacement of the movable body more than a predetermined amount to the second direction which is the opposite direction to the first direction in the direction around optical axis. Therefore, shakes of the movable body to the first direction and the second direction in the direction around the optical axis can be surely restricted.

In the optical unit in accordance with the present invention, it is characterized in that at least a part of the first portion and the second portion of the elastic member is disposed in the receiving part, the receiving part is formed with an elastic member facing part which faces the first portion and the second portion at a distance from the first portion and the second portion in the second axial line direction, and a distance in the second axial line direction between the second restricted part and the second restriction part is smaller than a distance between the first portion and the second portion and the elastic member facing part.

According to this embodiment, a distance in the second axial line direction between the second restricted part and the second restriction part is smaller than a distance between the first portion and the second portion and the elastic member facing part and thus, when the movable body is displaced in the direction around the optical axis with respect to the fixed body, the second restricted part is contacted with the second restriction part before the elastic member is deformed to contact with the elastic member facing part. As a result, deformation of the elastic member more than the distance between the second restricted part and the second restriction part can be prevented.

In this embodiment, for example, in a case that a distance between the second restricted part and the second restriction part is set within an elastic deformation region of the elastic member in the second axial line direction, plastic deformation of the elastic member can be prevented.

In the optical unit in accordance with the present invention, it is characterized in that the movable body is provided with at least one third restricted part in the optical axis direction and the fixed body is provided with a third restriction part at a distance from the third restricted part.

According to this embodiment, the movable body is provided with at least one third restricted part in the optical axis direction, and the fixed body is provided with a third restriction part at a distance from the third restricted part. Therefore, when the movable body is displaced with respect to the fixed body in the optical axis direction, the third restricted part is contacted with the third restriction part and thus, a shake in the optical axis direction of the movable body can be restricted. As a result, unintended deformation of the elastic member in the optical axis direction can be reduced and optical accuracy of the optical module can be maintained.

In the optical unit in accordance with the present invention, it is characterized in that the third restricted part is provided in the protruded part.

According to this embodiment, the protruded part is provided with the first restricted part and the third restricted part, or provided with the first restricted part, the second restricted part and the third restricted part. In this structure, the protruded part is provided with the respective restricted parts for restricting a shake of the movable body and thus, the shake of the movable body can be restricted at a position further near to the elastic member and unintended deformation of the elastic member can be surely reduced.

In the optical unit in accordance with the present invention, it is characterized in that the optical module includes a shake correction mechanism for a pitching direction and a yawing direction.

According to this embodiment, operations and effects similar to the operations and effects in the respective above-mentioned embodiments can be obtained.

Effects of the Invention

According to the present invention, a shake of the movable body can be restricted by the protruded part to which the elastic member is attached. In other words, the attaching part for the elastic member restricts a shake of the movable body and thus, the shake of the movable body can be restricted at a position near to the elastic member and unintended deformation of the elastic member can be reduced. As a result, optical accuracy of the optical module can be maintained.

DESCRIPTION OF EMBODIMENTS

Figure 1:
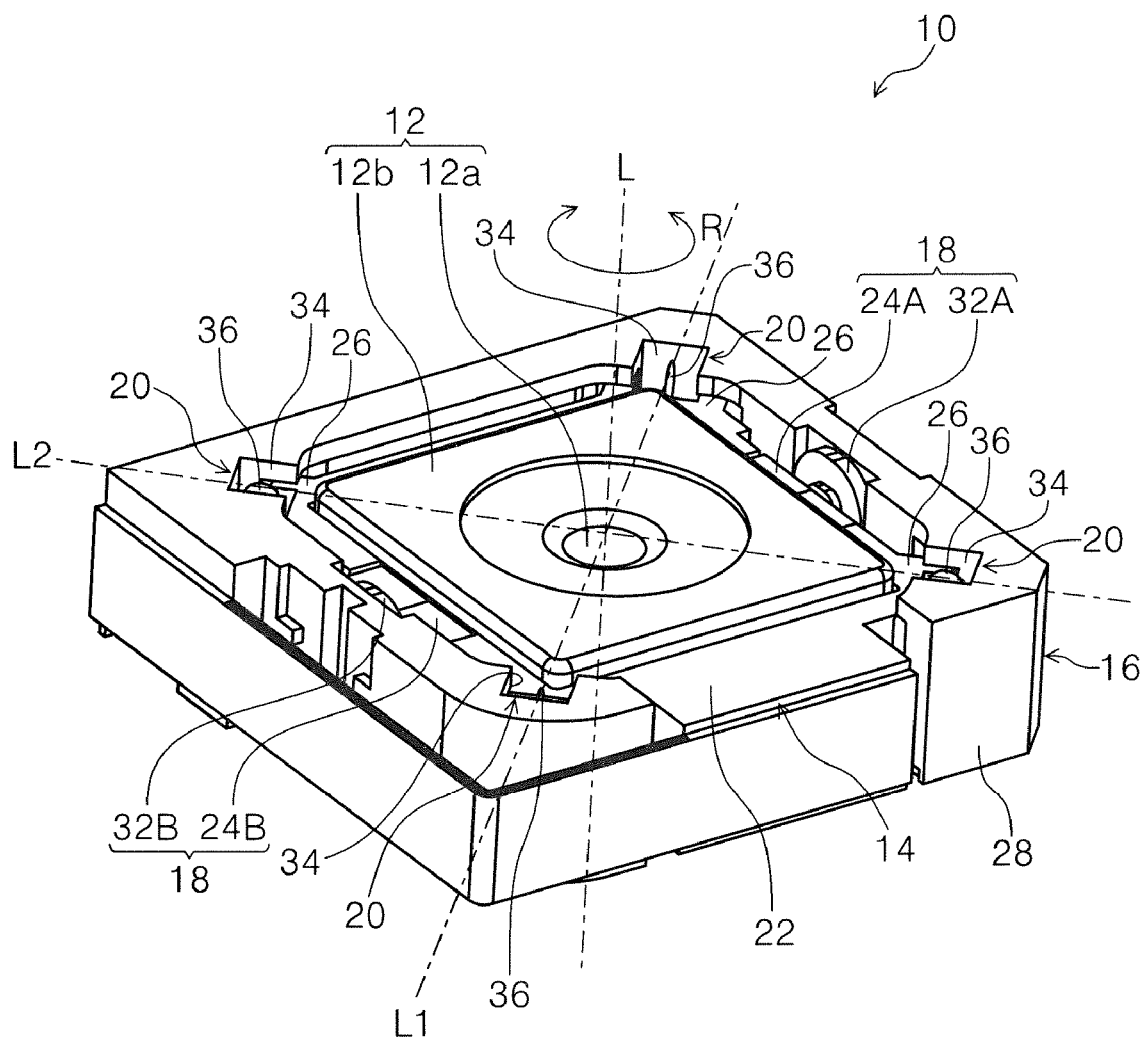
FIG. 1 is a perspective view showing an optical unit in accordance with the present invention.

Embodiments of the present invention will be described below with reference to the accompanying drawings. The same structures in the respective embodiments are indicated with the same reference signs and are described only in the first embodiment, and their descriptions will be omitted in the subsequent embodiments.

In each of FIG. 1 through FIG. 16A and FIG. 16B, an alternate long and short dash line with the reference sign "L" indicates an optical axis, an alternate long and short dash line with the reference sign "L1" indicates a first axial line intersecting the optical axis, and an alternate long and short dash line with the reference sign "L2" indicates a second axial line "L2" intersecting the optical axis "L" and the first axial line "L1". In the respective drawings, the "Z"-axis direction is the optical axis direction, the "R"-direction is a direction around the optical axis, the "X"-axis direction is a direction intersecting the optical axis, in other words, a yawing direction, and the "Y"-axis direction is a direction intersecting the optical axis, in other words, a pitching direction. A first axial line direction is a direction along the first axial line "L1", and a second axial line direction is a direction along the second axial line "L2".

First Embodiment

<<<Schematic Entire Structure of Optical Unit>>>

A structure of an optical unit 10 in accordance with a first embodiment will be described below with reference to FIG. 1 and FIG. 2. The optical unit 10 includes a movable body 14 having an optical module 12, a fixed body 16 which holds the movable body 14 in a displaceable state in the direction "R" around the optical axis, a rolling drive mechanism 18 structured to drive the movable body 14 in the direction "R" around the optical axis, and a rolling support mechanism 20 which turnably supports the movable body 14 in the direction "R" around the optical axis with respect to the fixed body 16.

<<<Regarding Optical Module>>>

In this embodiment, the optical module 12 is formed in a substantially rectangular case shape and is, for example, used as a thin camera mounted on a cellular phone with a camera and a tablet type PC, or the like. The optical module 12 includes a lens 12a on an object side "+Z", and an optical device for imaging and the like are incorporated in an inside of the rectangular case-shaped housing 12b. The optical module 12 in this embodiment is, as an example, incorporated with an actuator structured to correct shakes in a pitching direction "Y" and a yawing direction "X" occurred in the optical module 12 and is structured so that shake corrections in the pitching direction "Y" and the yawing direction "X" can be performed.

In this embodiment, the optical module 12 is structured so as to be capable of performing shake corrections in the pitching direction "Y" and the yawing direction "X". However, the present invention is not limited to this structure and, for example, the optical module 12 may be structured so as to be capable of performing one of shake corrections in the pitching direction "Y" and the yawing direction "X" and, alternatively, the optical module 12 may be structured to provide with an autofocus function without performing corrections in the pitching direction "Y" and the yawing direction "X".

<<<Regarding Movable Body>>>

Figure 2:
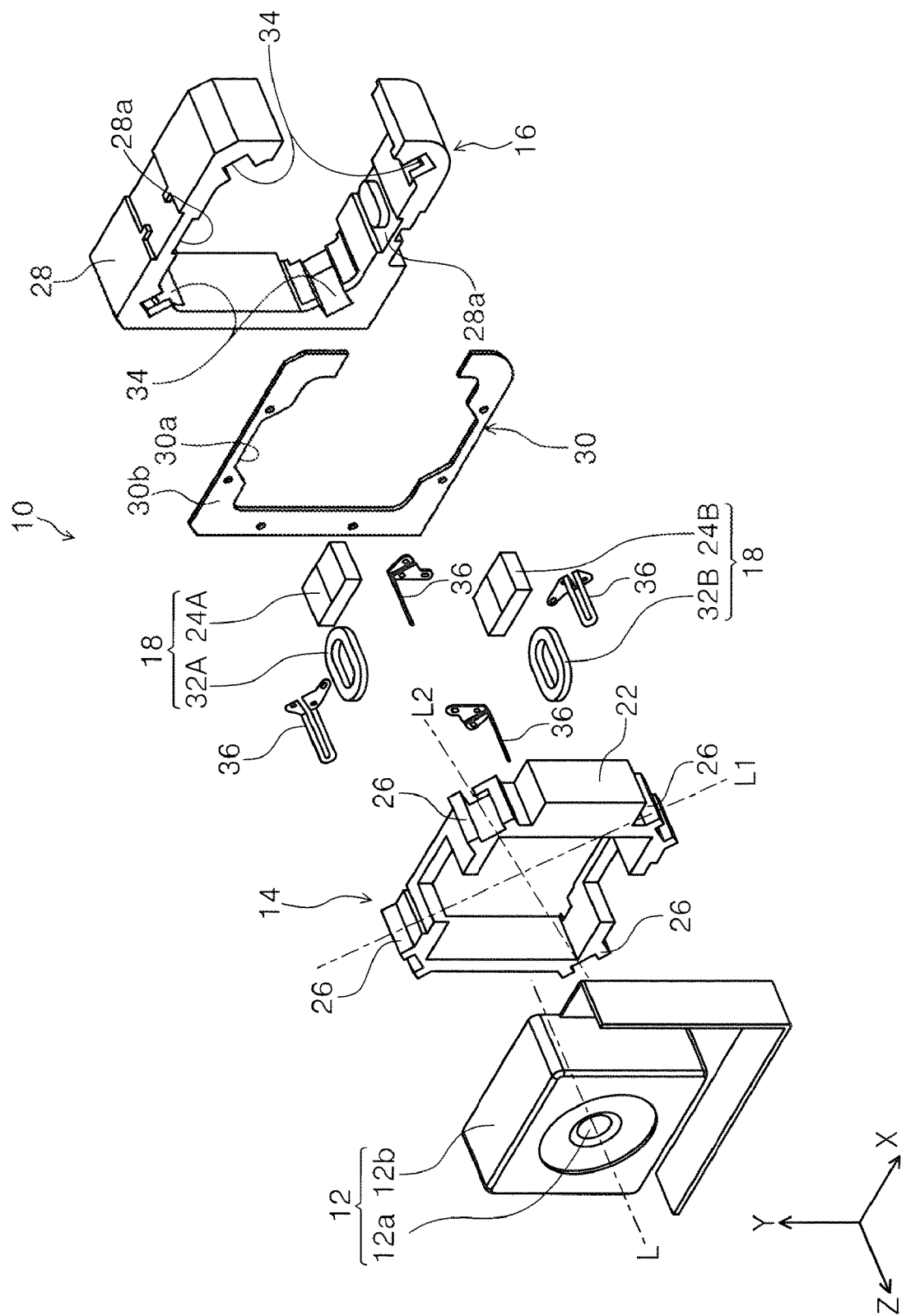
FIG. 2 is an exploded perspective view showing an optical unit in accordance with the present invention.

In FIG. 1 and FIG. 2, the movable body 14 includes the optical module 12, a holder frame 22 and magnets 24A and 24B. The holder frame 22 is structured as a rectangular frame-shaped member (FIG. 2 through FIG. 4) which is provided so as to surround remaining four faces except a front face where the lens 12a of the optical module 12 is provided and a rear face on the opposite side. The holder frame 22 in this embodiment is, as an example, structured so that the optical module 12 is detachable.

The magnets 24A and 24B for rolling correction are attached to outer faces of the holder frame 22 by utilizing two faces of the holder frame 38 which are faced each other. The holder frame 22 is formed with a plurality of protruded parts 26 which are protruded from the holder frame 22 toward an outer peripheral part, in other words, toward the fixed body 16 side, in the first axial line direction and the second axial line direction. In this embodiment, a plurality of the protruded parts 26 is respectively formed at positions facing each other with the optical axis "L" interposed therebetween and, as an example, a pair of the protruded parts 26 is formed in the first axial line direction and in the second axial line direction respectively. A structure of the protruded part 26 will be described below.

<<<Regarding Fixed Body>>>

Figure 3:
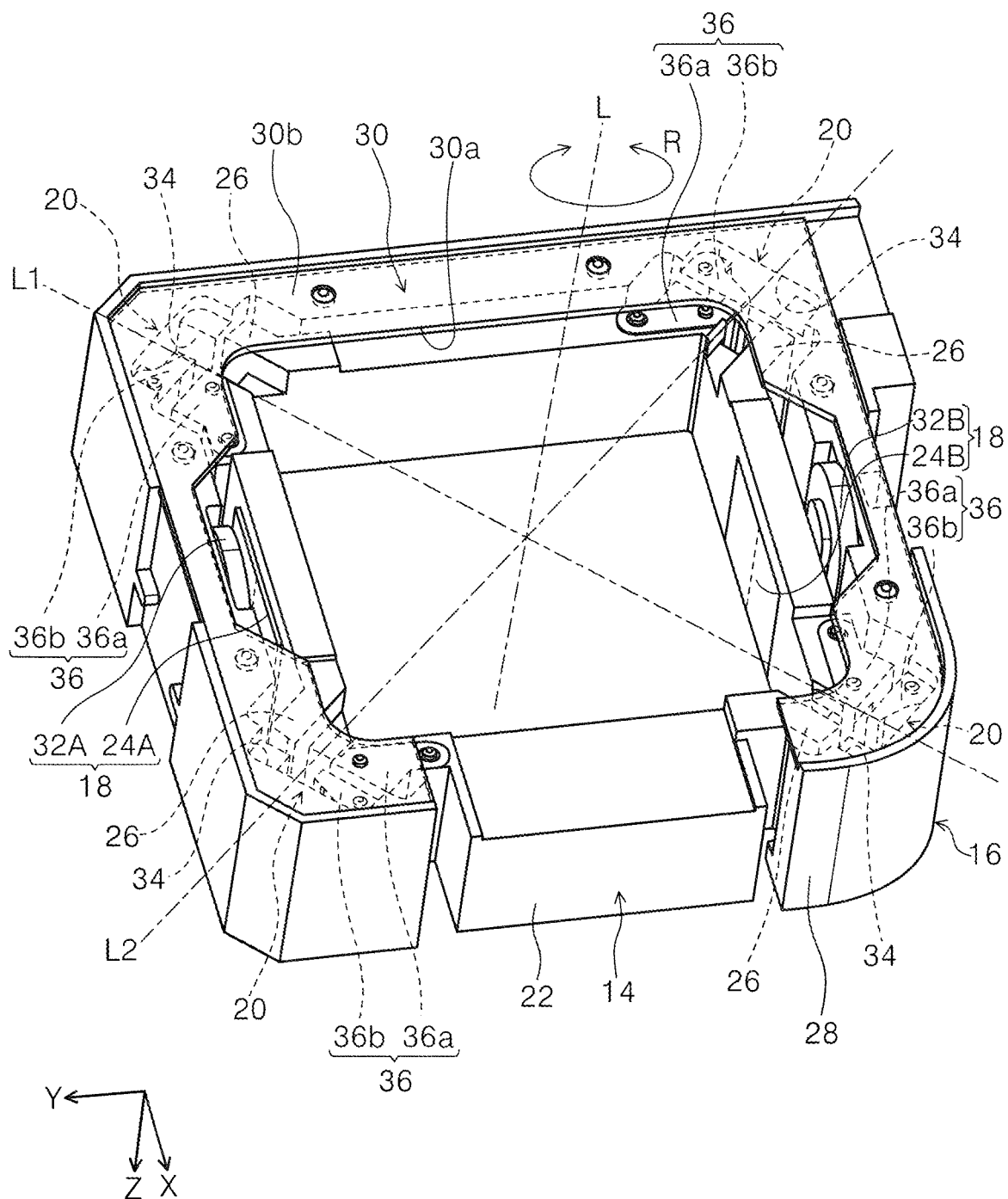
FIG. 3 is a perspective view showing a relationship between a movable body and a fixed body in an optical unit in accordance with the present invention.

In FIG. 1 through FIG. 3, the fixed body 16 includes a fixed frame 28, a bottom plate 30 and coils 32A and 32B. In this embodiment, the fixed frame 28 is structured as a rectangular frame-shaped member which is provided so as to surround at least three faces of the holder frame 22 of the movable body 14 in the direction "R" around the optical axis. In this embodiment, the fixed frame 28 is formed in a shape that a part of the fixed frame 28 is cut out in the "+X" axis direction with respect to the holder frame 22.

Four corners of the fixed frame 28 in a rectangular frame shape are respectively formed with receiving parts 34 in a recessed shape, which receive the protruded parts 26 of the holder frame 22, along the first axial line or along the second axial line. The receiving part 34 will be described below. In addition, inner faces of the fixed frame 28 are respectively provided with coil attaching parts 28a (FIG. 2) at positions facing the magnets 24A and 24B when the holder frame 22 is inserted into the fixed frame 28.

As shown in FIG. 1 and FIG. 3, the coils 32A and 32B are respectively attached to the coil attaching parts 28a. In this embodiment, each of the coil 32A and the coil 32B is, as an example, structured as a winding coil, but may be structured of a pattern substrate (coil substrate) in which a coil is incorporated into wiring in a substrate as a pattern.

In this embodiment, in FIG. 1 and FIG. 3, in a state that the movable body 14 is disposed in an inside of the fixed body 16, the magnet 24A and the coil 32A face each other, and the magnet 24B and the coil 32B face each other.

In this embodiment, a pair of the magnet 24A and the coil 32A and a pair of the magnet 24B and the coil 32B structure the rolling drive mechanism 18. Rolling correction of the movable body 14 is performed by the rolling drive mechanism 18.

When a shake occurs in the direction "R" around the optical axis in the optical unit 10, the shake in the direction "R" around the optical axis of the optical unit 10 is detected by a pair of a magnetic sensor (Hall element) not shown and either of the magnets 24A and 24B for rolling detection and correction through a variation of the magnetic flux density. The rolling drive mechanism 18 is operated so as to correct the shake based on a detected result of the shake. In other words, an electric current is supplied to the coils 32A and 32B so as to move the movable body 14 in a direction for canceling the shake of the optical unit 10 and the rolling drive mechanism 18 is driven and thereby, the shake in the direction "R" around the optical axis is corrected.

A drive source performing a correcting operation for a shake is not limited to a voice coil motor which is structured of respective pairs of the coils 32A and 32B and the magnets 24A and 24B like the rolling drive mechanism 18. As other drive sources, a stepping motor, a piezo element or the like may be utilized.

In this embodiment, the bottom plate 30 is attached to an end part on the "−Z" direction side of the fixed frame 28 in FIG. 3. The bottom plate 30 is structured as a flat plate member in a rectangular shape. In this embodiment, the bottom plate 30 is formed with an opening part 30a in a center part, and an outer end part 30b is formed around the opening part 30a. In this embodiment, in a state that the movable body 14 is held by the fixed body 16 (FIG. 3), the outer end part 30b is disposed on the "−Z" direction side with respect to the rolling support mechanism 20 so that a part of the outer end part 30b covers the rolling support mechanism 20 in the "Z"-axis direction. In this embodiment, the outer end part 30b of the bottom plate 30 functions as a third restriction part 52 which restricts displacement of the movable body 14 to the "−Z" axial direction. The third restriction part 52 will be described below.

<<<Regarding Rolling Support Mechanism>>>

In FIG. 1 through FIG. 3, the rolling support mechanism 20 is structured of the protruded part 26, the receiving part 34 and an elastic member 36. In FIG. 3 through FIG. 6, the elastic member 36 is, as an example, structured as a plate spring which is formed in a "U"-shape. In this embodiment, the elastic member 36 is provided with one end part 36a, the other end part 36b, a first elastic part 36c and a second elastic part 36d.

Figure 17:
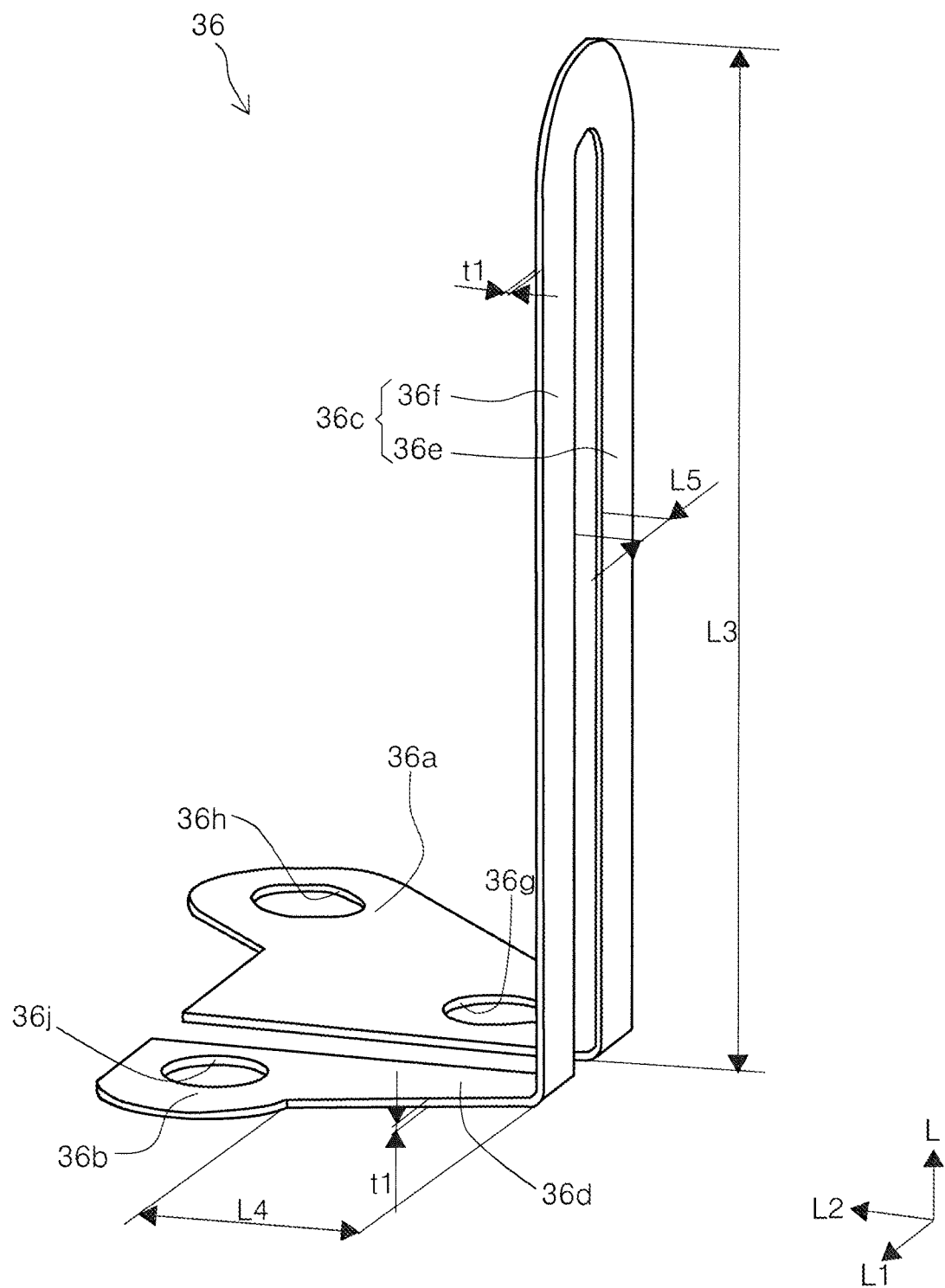
FIG. 17 is a perspective view showing an elastic member in accordance with a first embodiment.

In this embodiment, as shown in FIG. 17, the elastic member 36 is formed as a plate spring which is structured by appropriately bending a plate member having a plate thickness "t1". In this embodiment, the first elastic part 36c is, as shown in FIG. 17, provided with a first portion 36e extended along the optical axis direction and a second portion 36f extended in parallel with the first portion 36e along the optical axis direction.

Figure 7:
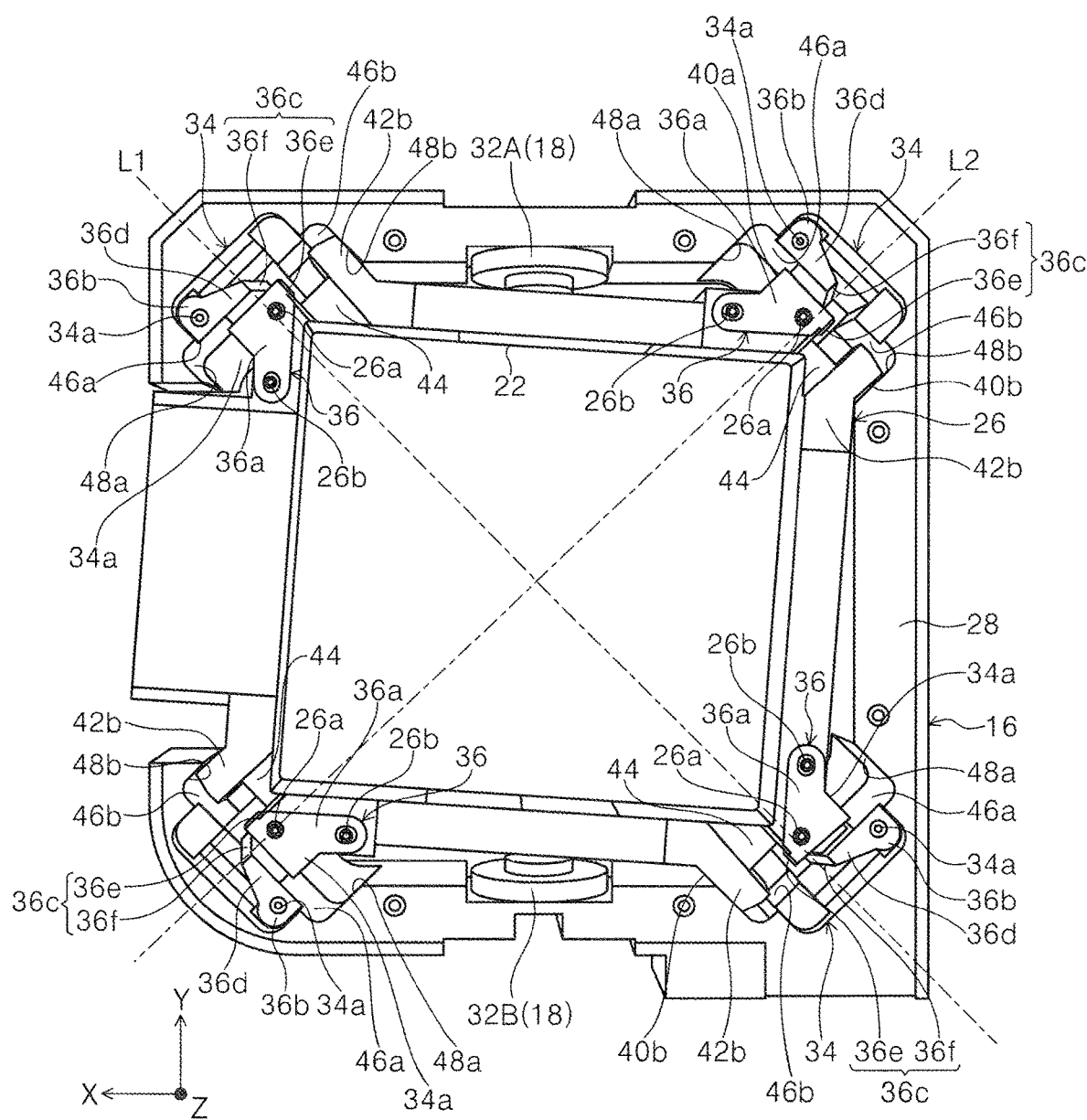
FIG. 7 is a plan view showing a state that a movable body is swung around an optical axis with respect to a fixed body.
Figure 8:
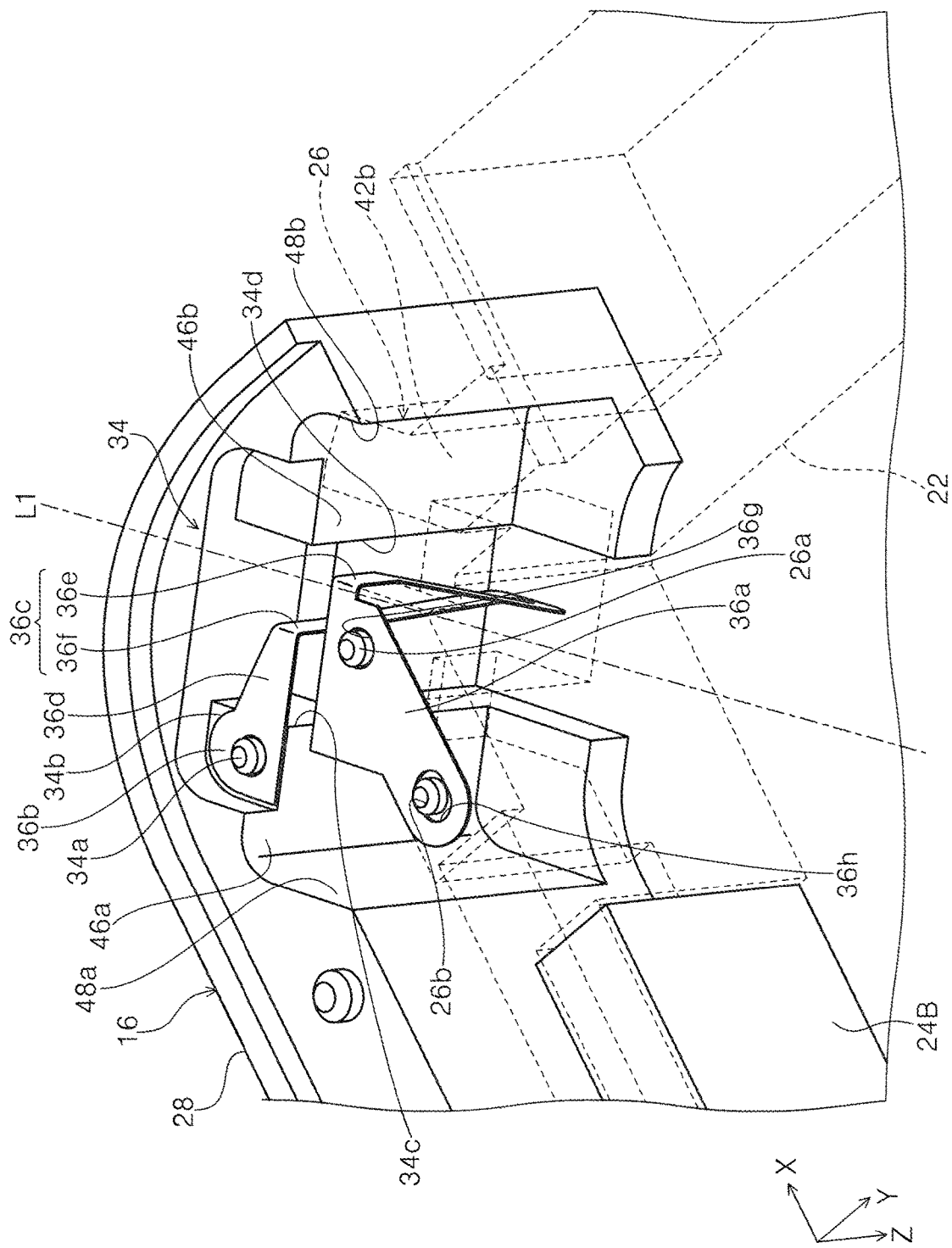
FIG. 8 is a perspective view showing a state of an elastic member in a state that a movable body is swung around an optical axis with respect to a fixed body.

The first portion 36e is extended from the one end part 36a to an upper side and then is curved, and the second portion 36f is extended to a lower side. A lower end of the second portion 36f is connected with the second elastic part 36d. An opposite side of the second elastic part 36d to a side which is connected with the second portion 36f is connected with the other end part 36b. In this embodiment, as shown in FIG. 7 and FIG. 8, when the movable body 14 is turned with respect to the fixed body 16, the first portion 36e and the second portion 36f are elastically deformed in reverse directions to each other in the direction "R" around the optical axis. Therefore, in the direction "R" around the optical axis, deforming amounts of the first portion 36e and the second portion 36f in the first elastic part 36c can be set half a deforming amount of the movable body 14 and thus, a load applied to the elastic member 36 can be reduced. As a result, durability against a force applied to the optical unit 10 in the optical axis direction, for example, an impact force such as dropping can be enhanced. Therefore, buckling of the first elastic part 36c of the elastic member 36 can be suppressed.

The second elastic part 36d is provided with a shape whose width in the first axial line direction becomes wide. As a result, strength of a connected portion of the second elastic part 36d with the other end part 36b can be increased. The posture of the elastic member 36 in FIG. 17 shows, as an example, a state that the first elastic part 36c is disposed along the optical axis "L" and the first portion 36e and the second portion 36f are separated from each other with a space therebetween in the first axial line direction.

In this embodiment, the first elastic part 36c is formed with a length "L3" in the optical axis direction, and the second elastic part 36d is, as an example, formed with a length "L4" in the second axial line direction. The first portion 36e and the second portion 36f are disposed with a space having a length "L5" as a second length therebetween in the first axial line direction.

In this embodiment, as shown in FIG. 17, in the second axial line direction, a plate thickness of the first elastic part 36c is "t1" and a length in the second axial line direction of the second elastic part 36d is "L4". The length "L4" is set larger than the plate thickness "t1". Therefore, in a case that a force is applied in the second axial line direction to the elastic member 36, the first elastic part 36c is elastically deformed in the second axial line direction. As a result, a shake in the direction "R" around the optical axis can be corrected by an elastic force generated in the first elastic part 36c.

On the other hand, in the optical axis direction, a length in the optical axis direction of the first elastic part 36c is "L3" and a plate thickness of the second elastic part 36d is "t1". The length "L3" is set larger than the plate thickness "t1". Therefore, in a case that a force is applied in the optical axis direction to the elastic member 36, the second elastic part 36d is elastically deformed in the optical axis direction. As a result, a shake in the optical axis direction can be corrected by an elastic force generated in the second elastic part 36d.

In other words, in the elastic member 36 in this embodiment, the first elastic part 36c is capable of generating an elastic force in the direction "R" around the optical axis, and the second elastic part 36d is capable of generating an elastic force in the optical axis direction. Therefore, elastic forces can be generated in the optical axis direction and in the direction "R" around the optical axis by one elastic member 36. As a result, even when an impact is applied to the optical unit 10 in the optical axis direction, the second elastic part 36d generates an elastic force in the optical axis direction and thus, unintended plastic deformation of the first elastic part 36c can be prevented. In addition, a structure of the optical unit 10 for a shake correction in the optical axis direction and the direction "R" around the optical axis can be simplified.

In this embodiment, one end part 36a of the elastic member 36 is formed with a first positioned part 36g and a turning restricted part 36h as a "recessed part or hole". In this embodiment, the first positioned part 36g is structured as a through-hole which penetrates through the one end part 36a. The turning restricted part 36h is structured as a long hole which penetrates through the one end part 36a.

The other end part 36b is formed with a second positioned part 36j as a "recessed part or hole". In this embodiment, the second positioned part 36j is structured as a through-hole which penetrates through the other end part 36b.

Figure 5:
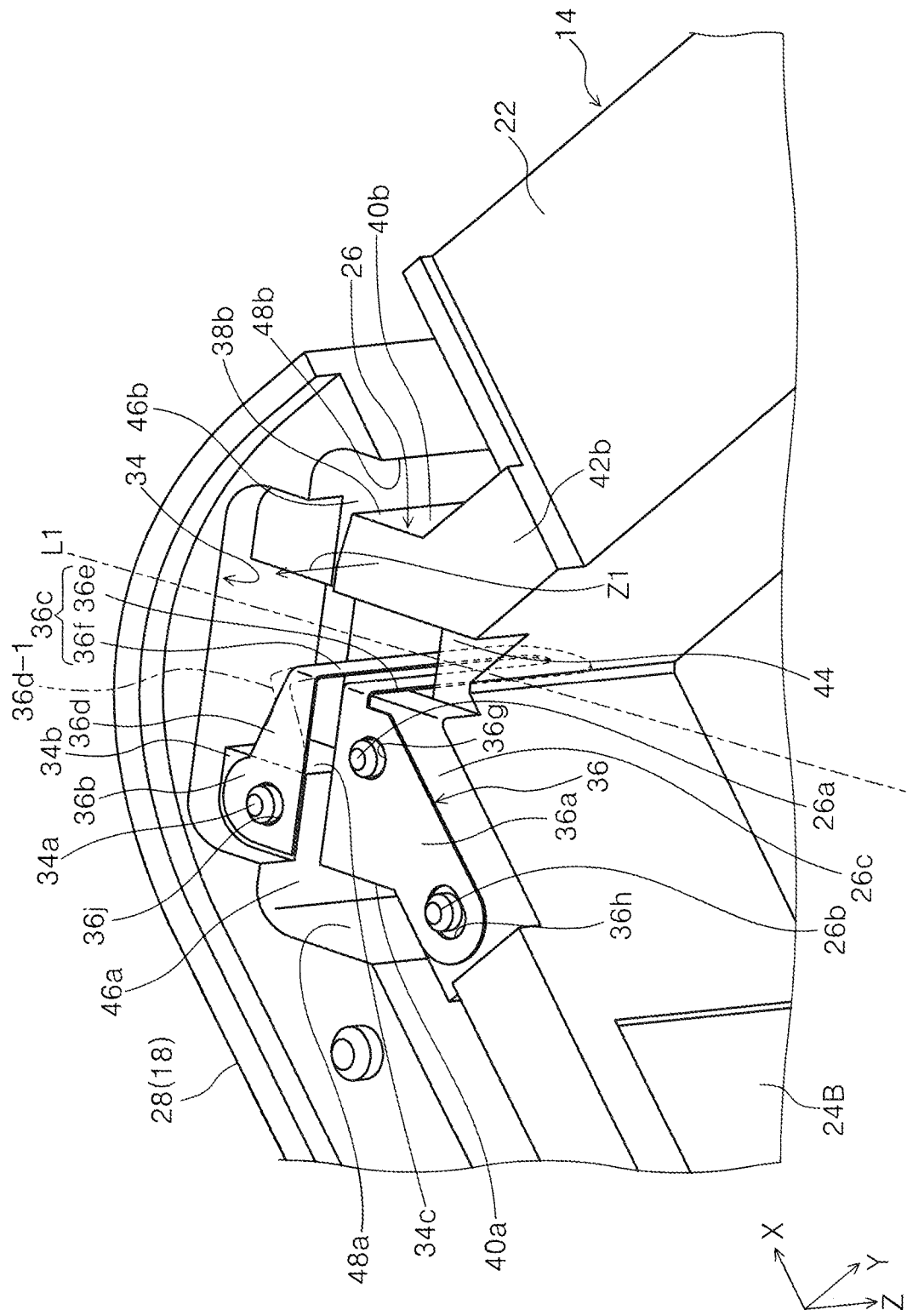
FIG. 5 is a perspective view showing a relationship between a movable body, a fixed body and an elastic member.

As shown in FIG. 5, in this embodiment, the one end part 36a is fixed to the protruded part 26 of the holder frame 22, and the other end part 36b is fixed to the receiving part 34 of the fixed frame 28. Specifically, the protruded part 26 is provided with a first positioning part 26a as a pin-shaped protruded part which is protruded from the protruded part 26 to the "−Z" direction, and a pin-shaped turning restriction part 26b which is protruded to the "−Z" direction from the protruded part 26. On the other hand, the receiving part 34 is formed with a second positioning part 34a as a pin-shaped protruded part which is protruded to the "−Z" direction from the receiving part 34.

In this embodiment, the first positioning part 26a of the protruded part 26 is inserted into the first positioned part 36g of the elastic member 36, and the turning restriction part 26b is inserted into the turning restricted part 36h. On the other hand, the second positioning part 34a is inserted into the second positioned part 36j.

In this embodiment, when the optical unit 10 is to be assembled, first, the first positioning part 26a of the protruded part 26 is inserted into the first positioned part 36g of the elastic member 36 and the first positioning part 26a is welded. As a result, positioning of the elastic member 36 is performed with respect to the holder frame 22. Subsequently, the turning restriction part 26b is inserted into the turning restricted part 36h in a long hole shape and the turning restriction part 26b is welded. As a result, turning restriction of the elastic member 36 with respect to the holder frame 22 is performed. In this manner, an attaching operation of the elastic member 36 to the holder frame 22 is completed.

Next, the holder frame 22 is inserted into the fixed frame 28 from the "−Z" direction side. After that, the second positioning part 34a of the receiving part 34 is inserted into the second positioned part 36j of the elastic member 36 and the second positioning part 34a is welded and thereby, the movable body 14 is held by the fixed body 16.

Therefore, the elastic member 36 is attached to the first positioning part 26a, which is a positioning pin, and the turning restriction part 26b, and the first positioning part 26a and the turning restriction part 26b are welded. In this state, a load is not applied to the second positioned part 36j of the elastic member 36. After that, the second positioned part 36j of the elastic member 36 is attached to the second positioning part 34a, which is a positioning pin, and the second positioning part 34a is welded. In other words, the movable body 14 can be assembled to the fixed body 16 in a state that a load is not applied to the elastic member 36 and thus, positioning and turning restriction of the elastic member 36 can be easily performed with respect to the movable body 14 and the fixed body 16, and the movable body 14 and the fixed body 16 can be assembled in a positional relationship with a high degree of accuracy. In addition, assembling work of the movable body 14 to the fixed body 16 is finished by these operations and thus, assembling work of the optical unit 10 can be simplified and assemblability is enhanced.

Figure 4:
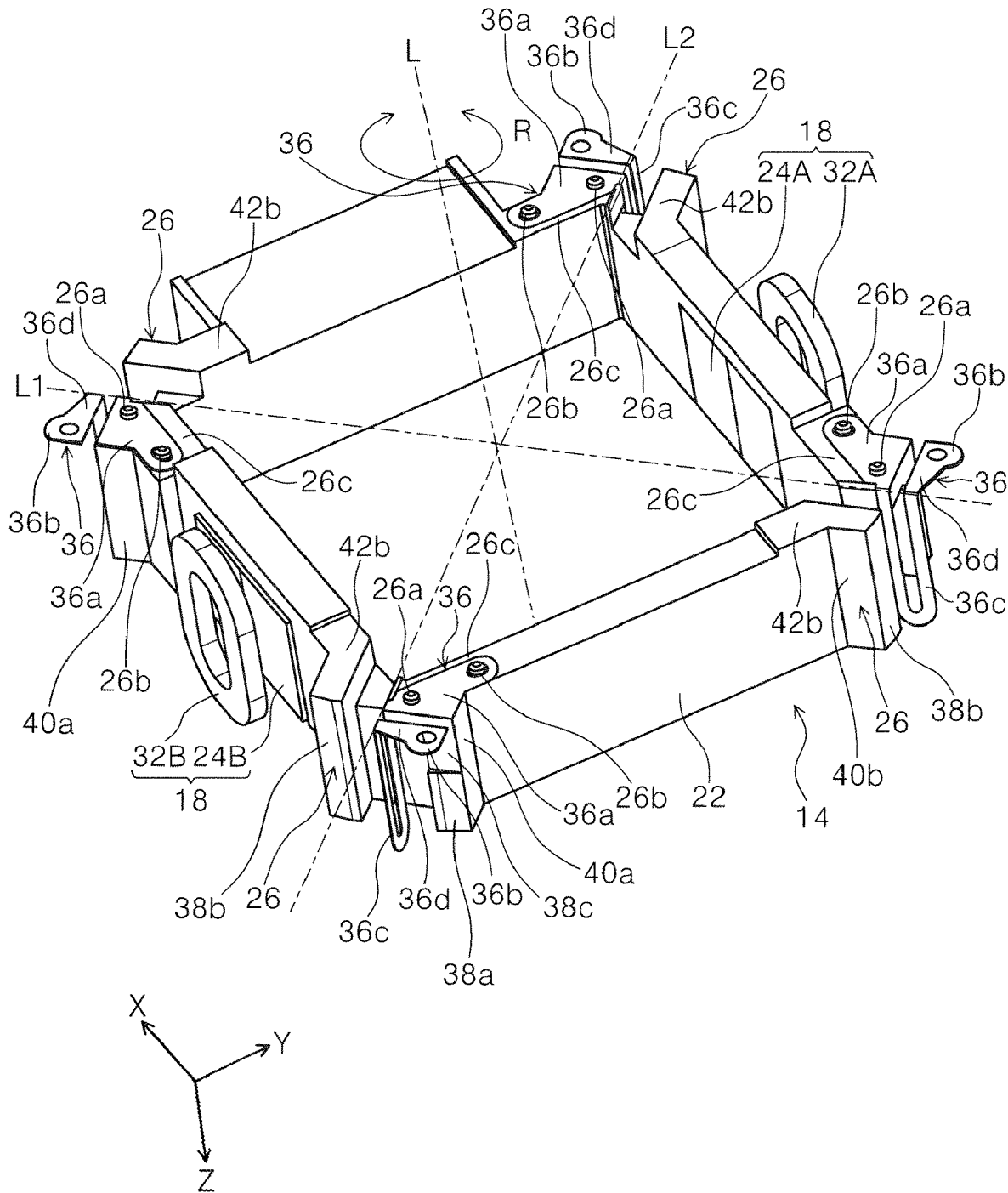
FIG. 4 is a perspective view showing a movable body, a rolling drive mechanism and a rolling support mechanism.

In this embodiment, as shown in FIG. 4 and FIG. 5, the one end part 36a of the elastic member 36 is fixed to the first elastic member fixing part 26c provided in the protruded part 26 through the first positioning part 26a and the turning restriction part 26b.

More specifically, the first elastic member fixing part 26c is located on the "+Z" direction side of the one end part 36a and supports the one end part 36a.

The other end part 36b of the elastic member 36 is fixed to the second elastic member fixing part 34b provided in the receiving part 34 through the second positioning part 34a. More specifically, the second elastic member fixing part 34b is located on the "+Z" direction side of the other end part 36b and supports the other end part 36b. As shown in FIG. 5, in this embodiment, a member for preventing displacement in the "Z"-axis direction of the second elastic part 36d is not disposed on the "+Z" direction side and the "−Z" direction side with respect to the second elastic part 36d of the elastic member 36. As a result, when an impact is applied, for example, in a direction of the arrow indicated with the reference sign "Z1", the second elastic part 36d is elastically deformed to the "−Z" direction due to displacement to the "−Z" axial direction side of the movable body 14 with respect to the fixed body 16. In FIG. 5, the two-dot chain line with the reference sign 36d-1 schematically shows the second elastic part 36d which is elastically deformed to the "−Z" direction.

When the second elastic part 36d is elastically deformed, the elastic member 36 generates an elastic force in the optical axis direction. The movable body 14 can be returned from a position displaced in the optical axis direction to the original position in the optical axis direction with respect to the fixed body 16 by the elastic force.

Figure 6:
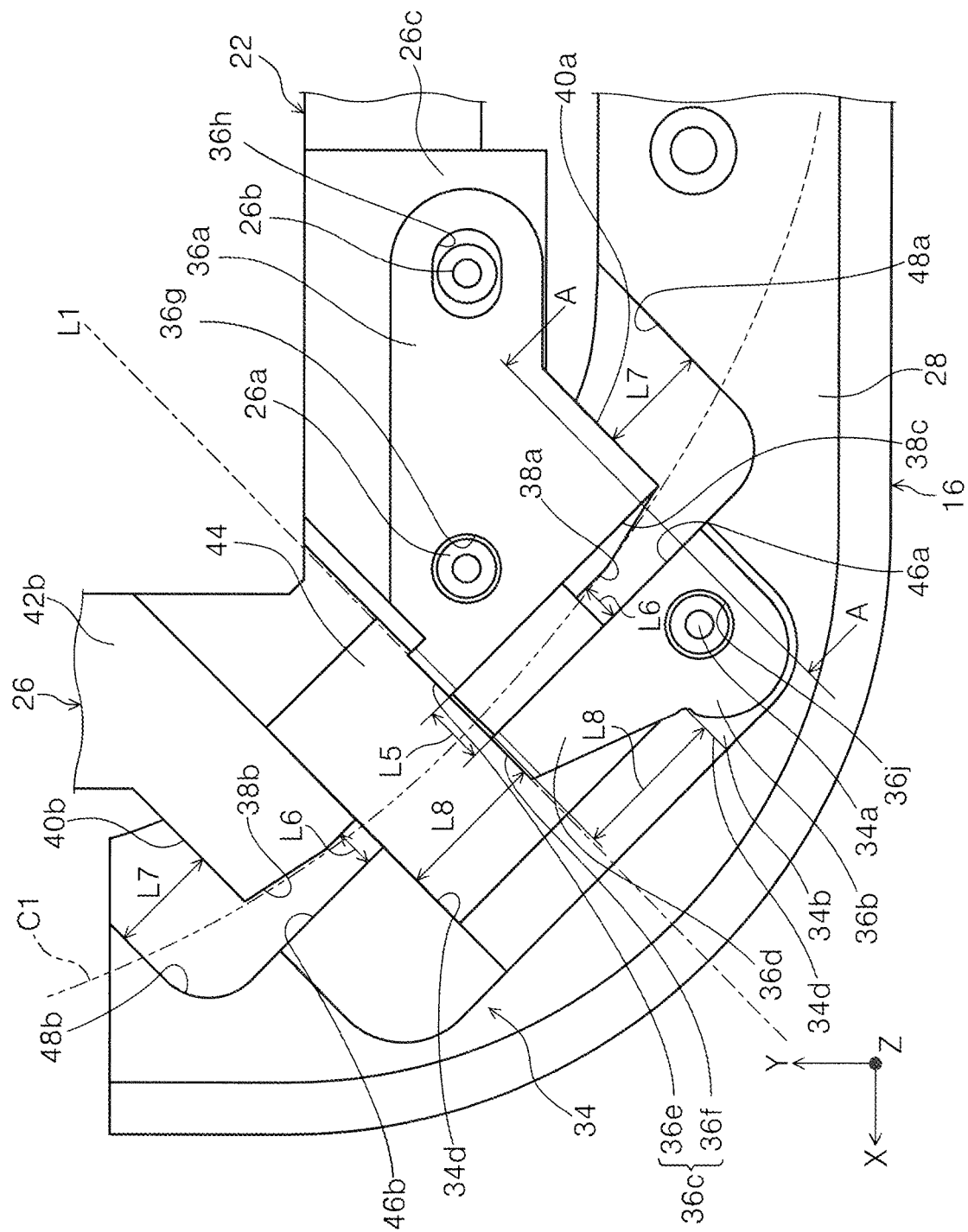
FIG. 6 is a plan view showing a relationship between a protruded part of a movable body and a receiving part of a fixed body.

Further, as shown in FIG. 4 through FIG. 6, the elastic member 36 is disposed between the movable body 14 and the fixed body 16 so that a plate thickness direction of the first elastic part 36c is directed in the direction "R" around the optical axis. Therefore, the elastic member 36 can be smoothly deformed in the direction "R" around the optical axis in a state that the movable body 14 is surely supported so as not to be carelessly displaced in the optical axis direction and in a direction intersecting the optical axis which are different from the direction "R" around the optical axis that is a turning direction.

<<<Regarding Relationship Between Protruded Part and Receiving Part>>>

A relationship between the protruded part 26 and the receiving part 34 will be described below with reference to FIG. 4 through FIG. 9.

First, the protruded part 26 will be described below. In this embodiment, the protruded parts 26 are protruded from four corners of the holder frame 22 along the first axial line direction or the second axial line direction. More specifically, the protruded part 26 in this embodiment is provided with a first restricted part 38, second restricted parts 40a and 40b, and third restricted parts 42a and 42b. In the following descriptions, as an example, a structure of the protruded part 26 which is protruded along the first axial line direction and the receiving part 34 which receives the protruded part 26 are described. However, in a case of the protruded part 26 protruded along the second axial line direction and the receiving part 34 which receives the protruded part 26, a relationship in the first axial line direction between the protruded part 26 and the receiving part 34 is interchanged with the second axial line direction.

In this embodiment, the first restricted part 38 is, as an example, formed on a tip end side of the protruded part 26 in the first axial line direction (FIG. 4 and FIG. 6). In this embodiment, the first restricted part 38 is, as shown in FIG. 6, formed as a curved surface in a circular arc shape as a whole. Specifically, the first restricted part 38 is, as an example, structured as a curved surface along a periphery of the imaginary circle "C1" with the optical axis "L" as a center.

In this embodiment, a center portion in the second axial line direction of the first restricted part 38 is formed with a groove part 44. The first elastic part 36c of the elastic member 36 is disposed in the groove part 44. Further, the center portion in the second axial line direction of the first restricted part 38 is cut out to provide the groove part 44, and the first restricted part 38 is divided into two portions in the second axial line direction to form the first restricted parts 38a and 38b.

In the protruded part 26, an end part on the "−Z" axial direction side of the first restricted part 38a on a side where the first elastic member fixing part 26c is provided is formed with a relief part 38c (FIG. 4) which is formed by cutting out a part of the first restricted part 38a. The relief part 38c is provided so that, when the movable body 14 is displaced to the "−Z" axial direction with respect to the fixed body 16, the first restricted part 38a avoids interfering with the other end part 36b and the second elastic part 36d of the elastic member 36.

In this embodiment, the first restricted part 38 is formed as a curved surface in a circular arc shape along a periphery of the imaginary circle "C1". However, the present invention is not limited to the structure. For example, the first restricted part 38 may be formed in a taper shape which is extended from the groove part 44 to an outer side in the second axial line along a tangent line (not shown) contacted with the periphery of the imaginary circle "C1" and is inclined to a side of the optical axis "L", in other words, to a side in the center direction as going to the outer side in the second axial line direction.

Figure 9:
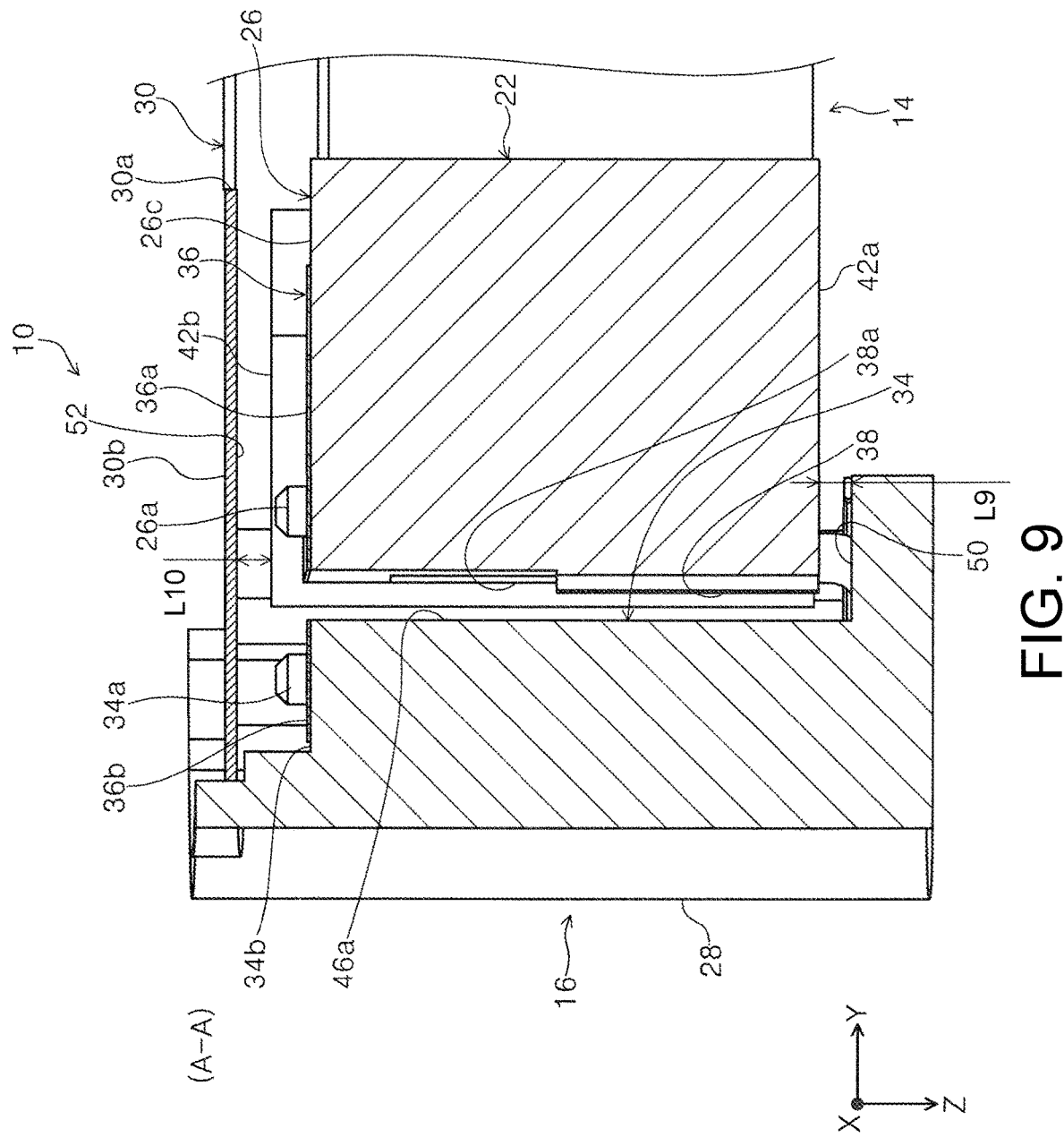
FIG. 9 is a cross-sectional side view showing a relationship between a protruded part and a receiving part.

In this embodiment, side faces of end parts on both sides in the second axial line direction of the protruded part 26 are structured as second restricted parts 40a and 40b (FIG. 4 through FIG. 6). In addition, an end part on the "+Z" direction side and an end part on the "−Z" direction side of the protruded part 26 are formed with third restricted parts 42a and 42b (FIG. 5, FIG. 6 and FIG. 9).

<<<Regarding Receiving Part>>>

Next, the receiving part 34 will be described below with reference to FIG. 5 through FIG. 9. In this embodiment, the receiving part 34 is structured as a recessed part, which is recessed along the first axial line direction or the second axial line direction at each of four corners of the fixed frame 28, and is structured so as to receive the protruded part 26 in its inside. More specifically, the receiving part 34 in this embodiment is provided with first restriction parts 46a and 46b, second restriction parts 48a and 48b, and a third restriction part 50.

As shown in FIG. 6, in a state that the protruded part 26 is received in the receiving part 34, the first restriction parts 46a and 46b are formed so as to face the first restricted parts 38a and 38b in the first axial line direction. The first restriction part 46a is formed as a face which faces the first restricted part 38a, and the first restriction part 46b is formed as a face which faces the first restricted part 38b.

In this embodiment, in the first axial line direction, distances between the first restriction parts 46a and 46b and the first restricted parts 38a and 38b are set to be a first length "L6". In this embodiment, the first length "L6" is a distance in a portion where a distance in the first axial line direction between the first restriction part 46a and the first restricted part 38a is the narrowest.

In this embodiment, the first restricted parts 38a and 38b are formed in a circular arc shape along the imaginary circle "C1" with the optical axis "L" as a center and thus, it is structured so that a distance between the first restriction part 46a and the first restricted part 38a and a distance between the first restriction part 46b and the first restricted part 38b are widened as going to an outer side in the second axial line direction. In other words, the first restricted part 38 is provided with a shape in which facing distances in the first axial line direction with respect to the first restriction parts 46a and 46b are widened as going to an outer side in the second axial line direction.

Therefore, as shown in FIG. 7, when the movable body 14 is turned in the direction "R" around the optical axis with respect to the fixed body 16, interferences of the first restricted parts 38a and 38b with the first restriction parts 46a and 46b can be restrained.

In this embodiment, for example, when an impact is applied to the movable body 14 in FIG. 6, in other words, to the holder frame 22 in the first axial line direction, the protruded part 26 is displaced toward a side of the first restriction parts 46a and 46b in an inside of the receiving part 34. In this case, when the holder frame 22 is going to be displaced larger than the first length "L6" in the first axial line direction, the first restricted parts 38a and 38b of the protruded part 26 are contacted with the first restriction parts 46a and 46b. As a result, displacement (shake) of the holder frame 22 exceeding the first length "L6" in the first axial line direction is restricted in a direction coming close to the first restriction parts 46a and 46b.

In this embodiment, another pair of the protruded part 26 and the receiving part 34 is formed between the movable body 14 and the fixed body 16 at a position on an opposite side in the first axial line with the optical axis "L" interposed therebetween. Therefore, two pairs of the protruded parts 26 and the receiving parts 34 are disposed with the optical axis "L" interposed therebetween on the first axial line and thus, displacement of the movable body 14 with respect to the fixed body 16, in other words, in FIG. 6, displacements of the protruded part 26 in both directions of a direction coming close to and a direction separating from the first restriction parts 46a and 46b can be restricted. Accordingly, deformation in the first axial line direction of the elastic member 36 exceeding a predetermined amount can be restrained and thus, unintended deformation can be restrained.

In this embodiment, the distance "L6" between the first restriction parts 46a and 46b and the first restricted parts 38a and 38b, in other words, the first length is set to be a distance smaller than the distance "L5", in other words, the second length between the first portion 36e and the second portion 36f of the elastic member 36. In this case, it is desirable that the distances "L6" between the first restriction parts 46a and 46b and the first restricted parts 38a and 38b are set to be a distance within an elastic deformation region in the first axial line direction of the first portion 36e or the second portion 36f of the elastic member 36.

According to this structure, even in a case that the movable body 14 is displaced in the first axial line direction with respect to the fixed body 16, deformation of the first portion 36e and the second portion 36f of the elastic member 36 can be set within the elastic deformation region and thus, plastic deformation of the first portion 36e and the second portion 36f of the elastic member 36 can be prevented.

In this embodiment, the second restriction parts 48a and 48b are structured as faces extending along the first axial line direction in the receiving part 34. In this embodiment, the second restriction part 48a is provided at a position facing the second restricted part 40a formed in the protruded part 26. Similarly, the second restriction part 48b is provided at a position facing the second restricted part 40b formed in the protruded part 26. In this embodiment, a pair of the second restriction part 48a and the second restricted part 40a and a pair of the second restriction part 48b and the second restricted part 40b are formed with spaces therebetween in the second axial line direction and function as shake restriction means in a turning direction of the movable body 14.

In this embodiment, a distance between the second restriction part 48a and the second restricted part 40a and a distance between the second restriction part 48b and the second restricted part 40b in the second axial line direction are set to be a length "L7".

In this embodiment, as shown in FIG. 7, when the movable body 14 is going to turn the length "L7" or more in the direction "R" around the optical axis with respect to the fixed body 16, the second restricted part 40b of the movable body 14 is contacted with the second restriction part 48b of the fixed body 16. As a result, a turning (shake) of the movable body 14 more than the length "L7" with respect to the fixed body 16 is restricted. Similarly, when the movable body 14 is going to turn the length "L7" or more with respect to the fixed body 16 in a direction opposite to the direction shown in FIG. 7, the second restricted part 40a of the movable body 14 is contacted with the second restriction part 48a of the fixed body 16 and thereby, a turning (shake) of the movable body 14 is restricted.

In this embodiment, the receiving part 34 is formed with elastic member facing parts 34c and 34d which face the first elastic part 36c of the elastic member 36. Specifically, in the receiving part 34, the elastic member facing part 34c is provided on a side where the second restriction part 48a is provided, and the elastic member facing part 34d is provided on a side where the second restriction part 48b is provided.

In this embodiment, a distance between the first elastic part 36c of the elastic member 36 and the elastic member facing part 34c and a distance between the first elastic part 36c and the elastic member facing part 34d are set to be a length "L8". In this embodiment, the length "L7" of the distance between the second restriction part 48a and the second restricted part 40a and the distance between the second restriction part 48b and the second restricted part 40b is set to be smaller than the length "L8" of the distance between the first elastic part 36c and the elastic member facing part 34c and the distance between the first elastic part 36c and the elastic member facing part 34d.

Therefore, as shown in FIG. 7 and FIG. 8, the movable body 14 is turned with respect to the fixed body 16 and, when the first portion 36e and the second portion 36f of the first elastic part 36c of the elastic member 36 are respectively elastically deformed in reverse directions in the direction "R" around the optical axis, the first portion 36e can be prevented from contacting with the elastic member facing part 34d, and the second portion 36f can be prevented from contacting with the elastic member facing part 34c.

In addition, it is desirable that the lengths "L7" of the distance between the second restriction part 48a and the second restricted part 40a and the distance between the second restriction part 48b and the second restricted part 40b are set to be a distance within the elastic deformation region in the second axial line direction of the first portion 36e or the second portion 36f of the elastic member 36. According to this structure, unintended deformation, i.e., plastic deformation of the first elastic part 36c can be prevented.

Next, the third restriction parts 50 and 52 will be described below with reference to FIG. 3 and FIG. 9. In this embodiment, an end part on the "+Z" axial direction side of the receiving part 34 is provided with the third restriction part 50. The third restriction part 50 is disposed on the "+Z" direction side with respect to the protruded part 26 with a space having a length "L9" therebetween and is structured to cover the protruded part 26 from the "+Z" direction side. Specifically, the third restriction part 50 faces the third restricted part 42a of the end part on the "+Z" axial direction side of the protruded part 26 with a space having the length "L9". The third restriction part 50 restricts displacement of the movable body 14 to the "+Z" axial direction side when the movable body 14 is going to displace more than the length "L9" to the "+Z" axial direction.

On the other hand, the outer end part 30b of the bottom plate 30 is disposed on the "−Z" direction side with respect to the protruded part 26 with a space having a length "L10" therebetween. A portion of the outer end part 30b which faces the protruded part 26 functions as the third restriction part 52 which restricts displacement to the "−Z" axial direction of the movable body 14. Specifically, the third restriction part 52 faces the third restricted part 42b of an end part on the "−Z" axial direction side of the protruded part 26 with a space having the length "L10" therebetween. The third restriction part 52 restricts displacement of the movable body 14 to the "−Z" axial direction side when the movable body 14 is going to displace more than the length "L10" to the "−Z" axial direction.

In this embodiment, it is desirable that the length "L9" and the length "L10" are set to be distances within an elastic deformation region in the optical axis direction of the second elastic part 36d of the elastic member 36. According to this structure, unintended deformation, i.e., plastic deformation of the second elastic part 36d can be prevented.

In this embodiment, the movable body 14 and the fixed body 16 are structured so that two pairs of the protruded parts 26 and the receiving parts 34 are provided in the first axial line direction with the optical axis "L" interposed therebetween and that two pairs of the protruded parts 26 and the receiving parts 34 are provided in the second axial line direction with the optical axis "L" interposed therebetween. In addition, each of the protruded parts 26 is provided with the first restricted part 38, the second restricted part 40 and the third restricted part 42, and each of the receiving parts 34 and the bottom plate 30 are provided with the first restriction part 46, the second restriction part 48 and the third restriction parts 50 and 52. These pairs of the restricted parts 38, 40 and 42 and the restriction parts 46, 48, 50 and 52 facing each other are respectively structured to restrict displacement (shake) of the movable body 14 with respect to the fixed body 16 in the first axial line direction, the second axial line direction and the optical axis direction.

In addition, the elastic member 36 is attached to the protruded part 26 and the receiving part 34 which are a means for restricting displacement (shake). Therefore, a load applied to the elastic member 36 due to a shake of the movable body 14 can be directly reduced and thus, unintended deformation, in other words, plastic deformation and the like are restrained and optical performance of the optical unit 10 can be maintained. In addition, an attaching portion for the elastic member 36 is structured as a restriction means and thus, a shake of the movable body 14 can be restricted with a high degree of accuracy.

Modified Embodiment of First Embodiment (1) In the embodiment described above, the movable body 14 and the fixed body 16 are structured so that two pairs of the protruded parts 26 and the receiving parts 34 are provided in the first axial line direction with the optical axis "L" interposed therebetween and two pairs of the protruded parts 26 and the receiving parts 34 are provided in the second axial line direction with the optical axis "L" interposed therebetween. However, it may be structured that a pair of the protruded part 26 and the receiving part 34 is provided at each of rotationally symmetrical positions at equal intervals in the direction "R" around the optical axis. Also in this structure, similar operations and effects to the above-mentioned structure can be obtained. This modified embodiment may be applied to second and subsequent embodiments described below.

Figure 10:
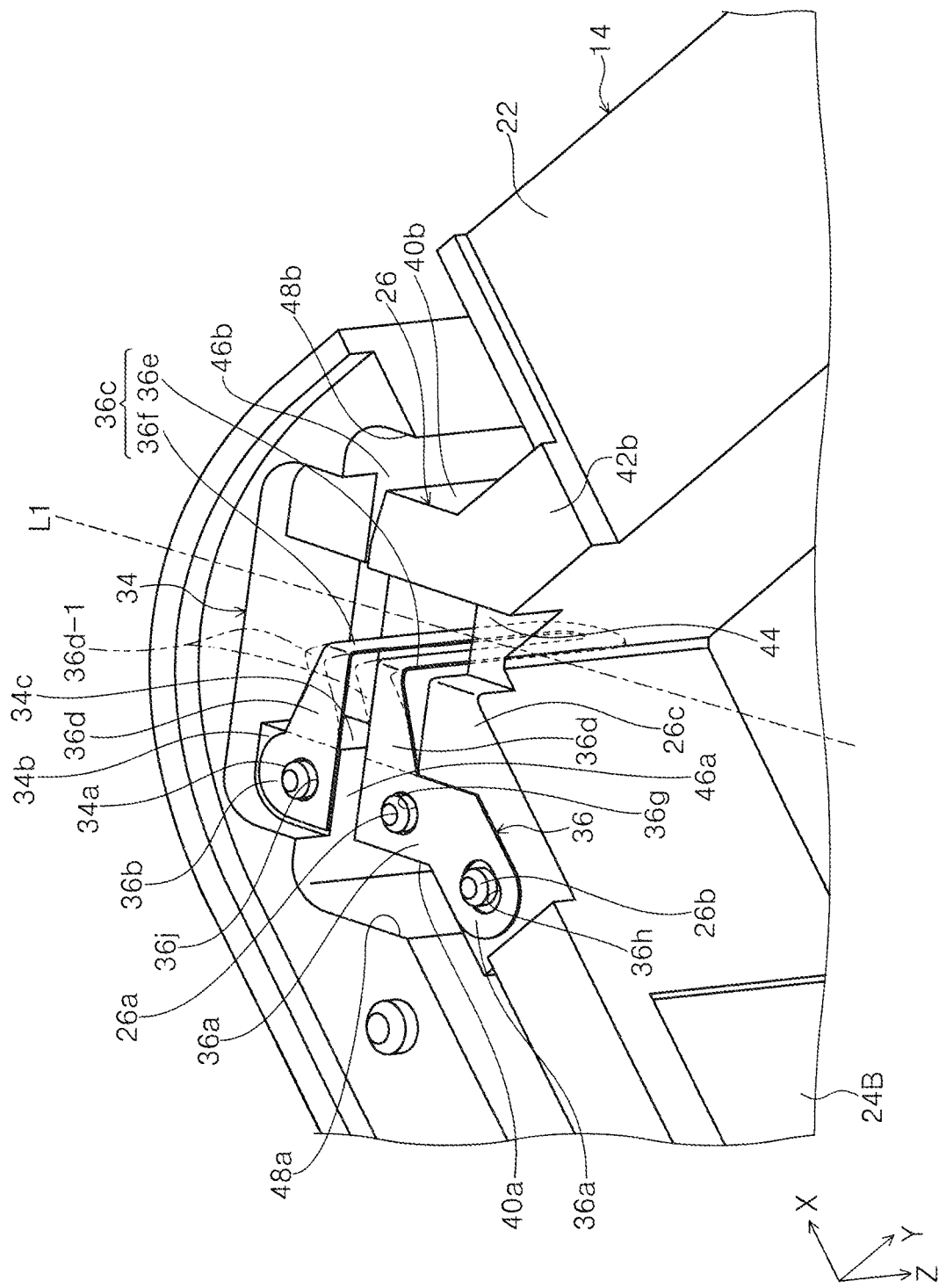
FIG. 10 is a perspective view showing a modified embodiment of an elastic member in accordance with the present invention.

(2) In the embodiment described above, the elastic member 36 is structured so that the second elastic part 36d is provided between the first elastic part 36c and the other end part 36b. However, instead of the structure, it may be structured that the second elastic part 36d is provided between the first elastic part 36c and the one end part 36a and, as shown in FIG. 10, it may be structured that the second elastic parts 36d are respectively provided between the first elastic part 36c and the one end part 36a and between the first elastic part 36c and the other end part 36b. Especially, when the second elastic part 36d is provided at two positions, durability in the optical axis direction of the elastic member 36, in other words, durability of the optical unit 10 can be improved. As a result, buckling of the second elastic part 36d of the elastic member 36 can be suppressed. In FIG. 10, the two-dot chain line with the reference sign 36d-1 schematically shows the second elastic parts 36d which are elastically deformed in the optical axis direction.

Second Embodiment

A second embodiment of the optical unit 10 will be described below with reference to FIG. 11 and FIG. 12. The second embodiment differs from the first embodiment in a shape of an elastic member 54. Structures other than the elastic member 54 are similar to the first embodiment.

Figure 11:
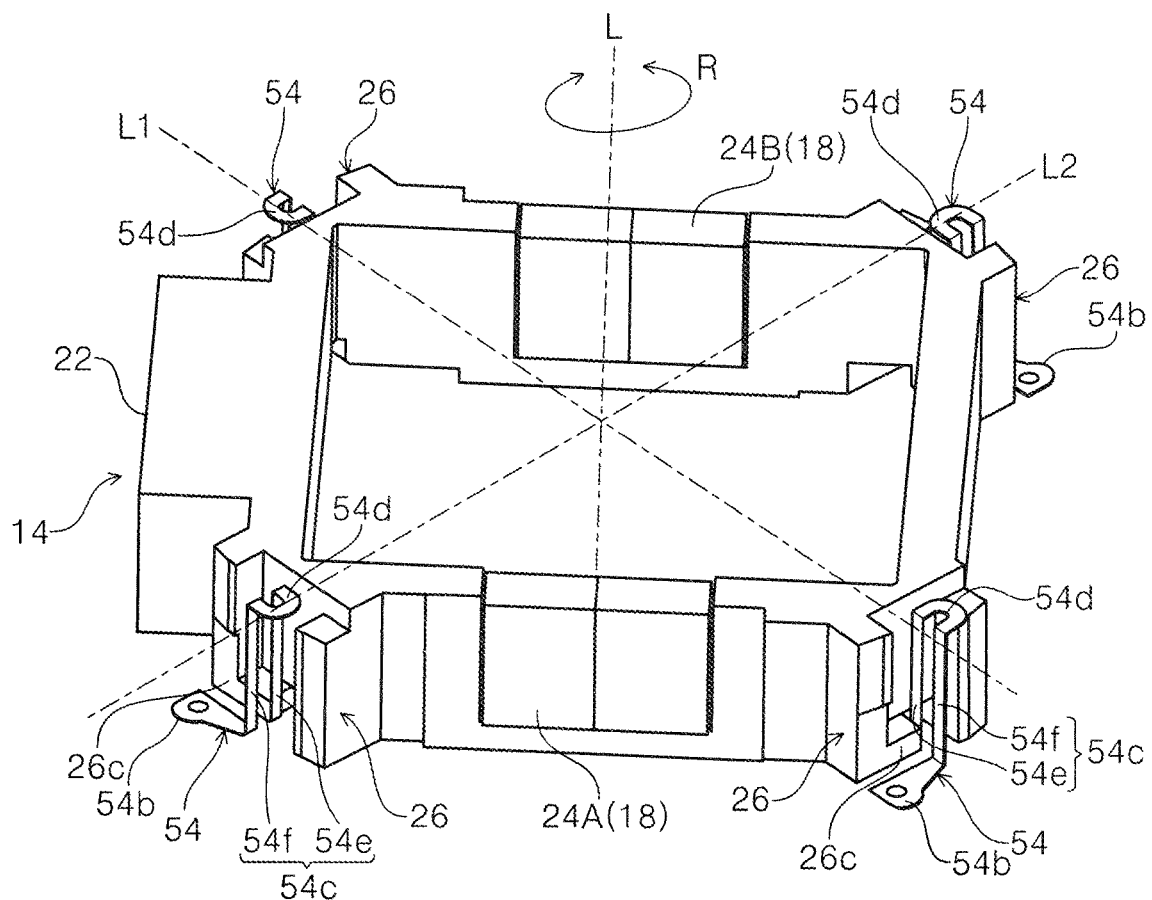
FIG. 11 is a perspective view showing a movable body and a rolling support mechanism in accordance with a second embodiment.

In FIG. 11, also in this embodiment, it is structured that one end part 54a of the elastic member 54 is attached to the protruded part 26 provided in each of four corners of the holder frame 22 and the other end part 54b is attached to the receiving part 34 of the fixed frame 28 not shown.

Figure 12:
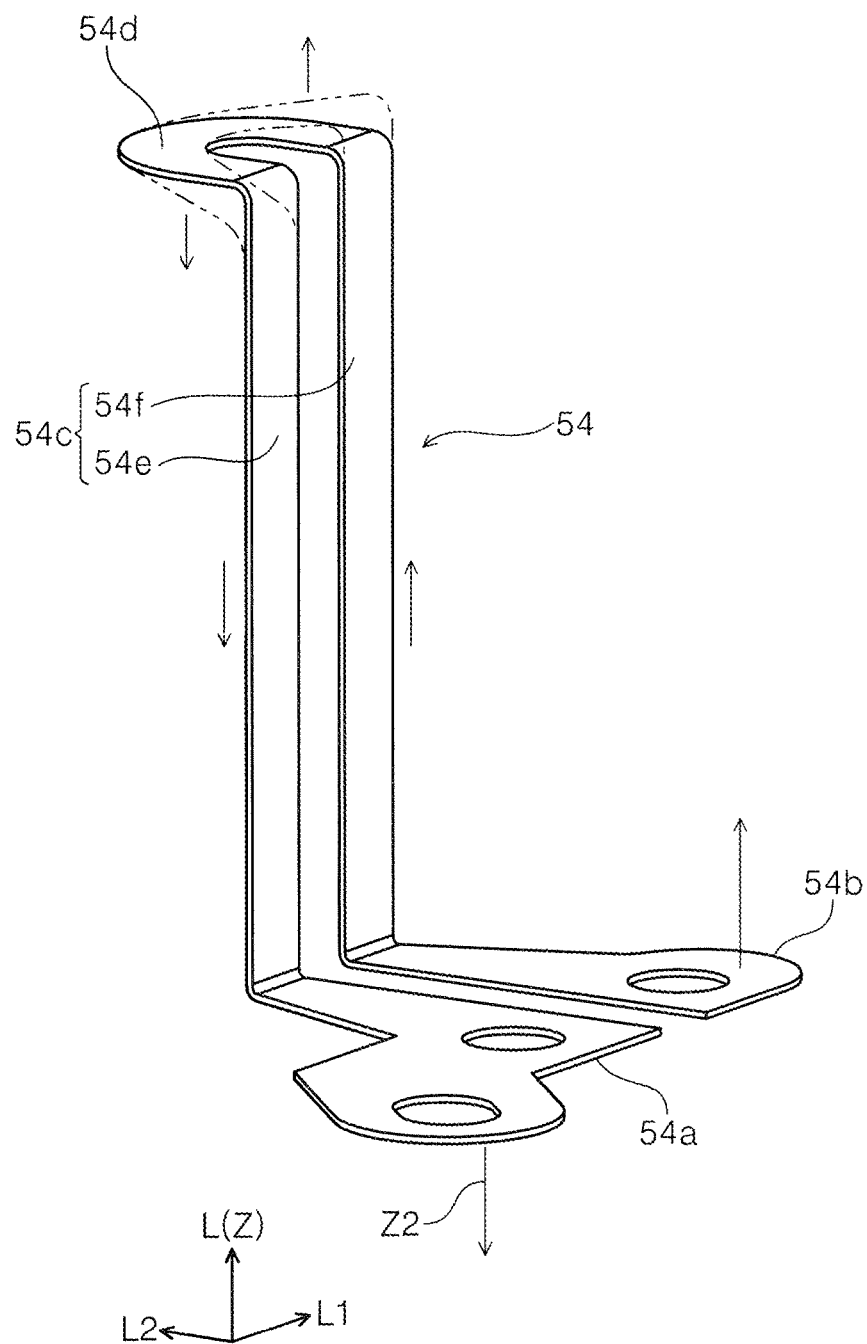
FIG. 12 is a perspective view showing an elastic member in accordance with a second embodiment.

In FIG. 12, the elastic member 54 is provided with one end part 54a, the other end part 54b, a first elastic part 54c and a second elastic part 54d, and is formed in a "U"-shape as a whole. The first elastic part 54c is extended along the optical axis direction and is provided with a first portion 54e and a second portion 54f. The first portion 54e and the second portion 54f are, as an example, disposed with a space therebetween in the second axial line direction. A posture of the elastic member 54 in FIG. 12 shows one example, and a direction where the first portion 54e and the second portion 54f are spaced may be the first axial line direction. Further, in FIG. 12, the optical axis direction is set in the "Z"-axis direction.

In this embodiment, the second elastic part 54d is formed between the first portion 54e and the second portion 54f of the first elastic part 54c. The second elastic part 54d is, as an example, extended in the second axial line direction, in other words, in a direction intersecting the optical axis "L". The second elastic part 54d in this embodiment is extended in the second axial line direction from the first portion 54e and then, is curved in a "U"-shape and connected with the second portion 54f. In other words, the second elastic part 54d in this embodiment structures a "U"-shaped portion of the elastic member 54.

In the elastic member 54 in this embodiment, when a force in the optical axis direction, for example, a force with the reference sign "Z2" is applied between the one end part 54a and the other end part 54b, the other end part 54b is fixed to the fixed body 16 and thus, the one end part 54a is going to displace in a direction that the force "Z2" is applied, i.e., to the "−Z" direction in FIG. 12. Therefore, the first portion 54e and the second portion 54f are going to displace in reverse directions in the optical axis direction ("Z"-axis direction). As a result, a portion of the second elastic part 54d connected with the first portion 54e is displaced to the "−Z" axial direction side and a portion connected with the second portion 54f is going to displace to the "+Z" direction side.

As a result, a displacement amount of the second elastic part 54d can be made smaller than a displacement amount of the movable body 14 and thus, a load applied to the second elastic part 54d can be reduced. Further, the second elastic part 54d is formed in a "U"-shape and thus, durability of the second elastic part 54d can be enhanced and buckling of the second elastic part 54d can be suppressed.

Third Embodiment

Figure 13:
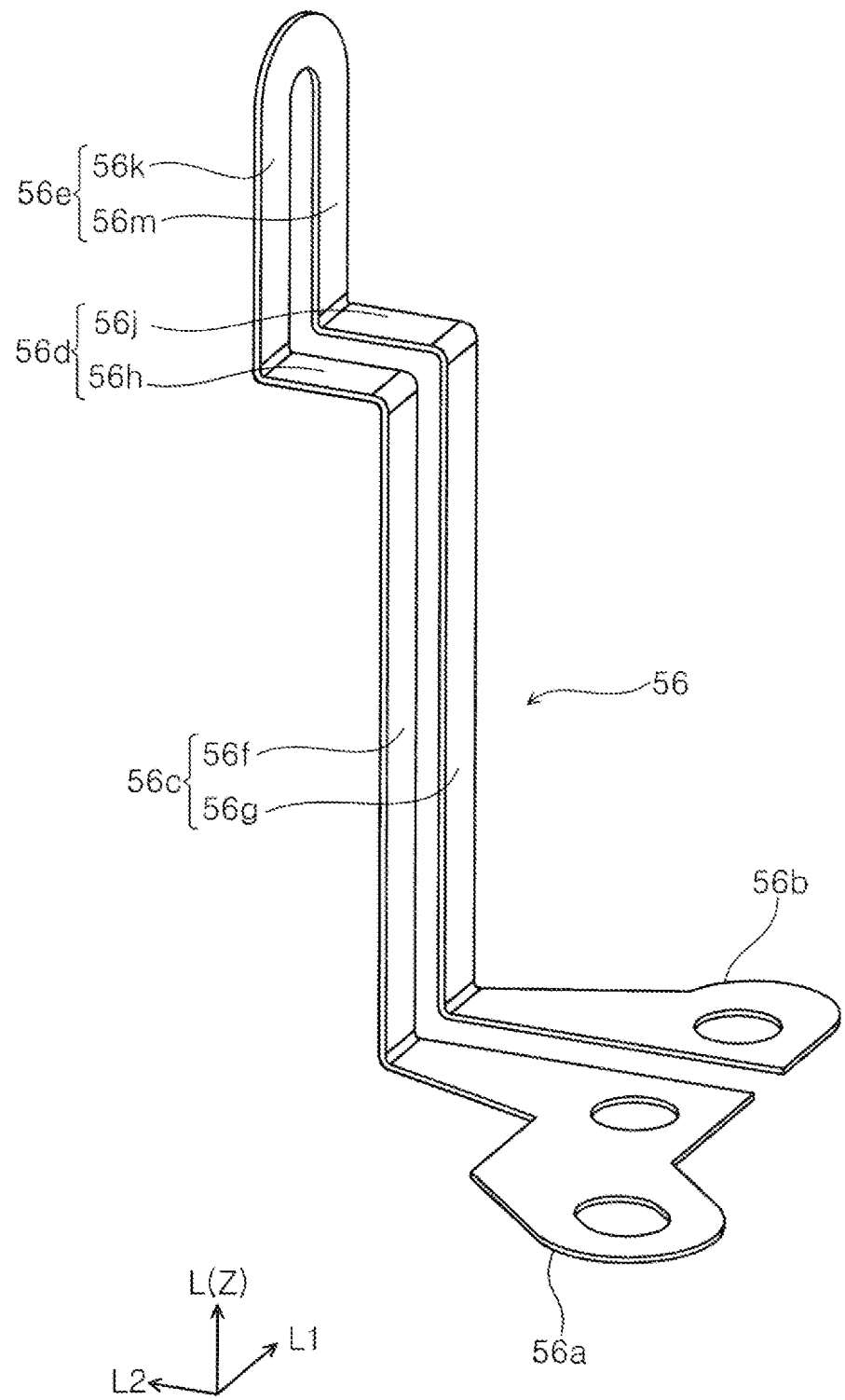
FIG. 13 is a perspective view showing an elastic member in accordance with a third embodiment.

A third embodiment of the optical unit 10 will be described below with reference to FIG. 13. The third embodiment differs from the first embodiment and the second embodiment in a shape of an elastic member 56. Structures other than the elastic member 56 are similar to the first embodiment.

The elastic member 56 is provided with one end part 56a, the other end part 56b, a first elastic part 56c, a second elastic part 56d and a third elastic part 56e, and is formed in a "U"-shape as a whole. The first elastic part 56c is extended along the optical axis direction and is provided with a first portion 56f and a second portion 56g. The second elastic part 56d is extended along a direction intersecting the optical axis, i.e., along the second axial line direction in FIG. 13, and is provided with a first portion 56h and a second portion 56j. The third elastic part 56e is extended along the optical axis direction and is provided with a first portion 56k and a second portion 56m.

In this embodiment, the elastic member 56 is provided, in order from one end part 56a, with the first portion 56f, the first portion 56h and the first portion 56k, and is provided, in order from the other end part 56b, with the second portion 56g, the second portion 56j and the second portion 56m. The third elastic part 56e is formed in a "U"-shape. In this embodiment, the first portions 56f, 56h and 56k and the second portions 56g, 56j and 56m are, as an example, disposed with a space therebetween in the second axial line direction. A posture of the elastic member 56 in FIG. 13 shows one example, and a direction where the first portions 56f, 56h and 56k and the second portions 56g, 56j and 56m are spaced may be the first axial line direction. Further, in FIG. 13, the optical axis direction is set in the "Z"-axis direction.

In this embodiment, two portions, specifically, the first elastic part 56c and the third elastic part 56e which are structured to generate elastic forces in the direction "R" around the optical axis are provided. Further, the second elastic part 56d is provided as a portion which is structured to generate an elastic force in the optical axis direction. In this embodiment, two portions which generate elastic forces in the direction "R" around the optical axis are provided and thus, a shake in the direction "R" around the optical axis can be surely restricted. In addition, the second elastic part 56*d* is provided with the first portion 56*h* and the second portion 56*j* and thus, durability of the second elastic part 56*d* can be enhanced and buckling of the second elastic part 56*d* can be suppressed.

Fourth Embodiment

Figure 14:
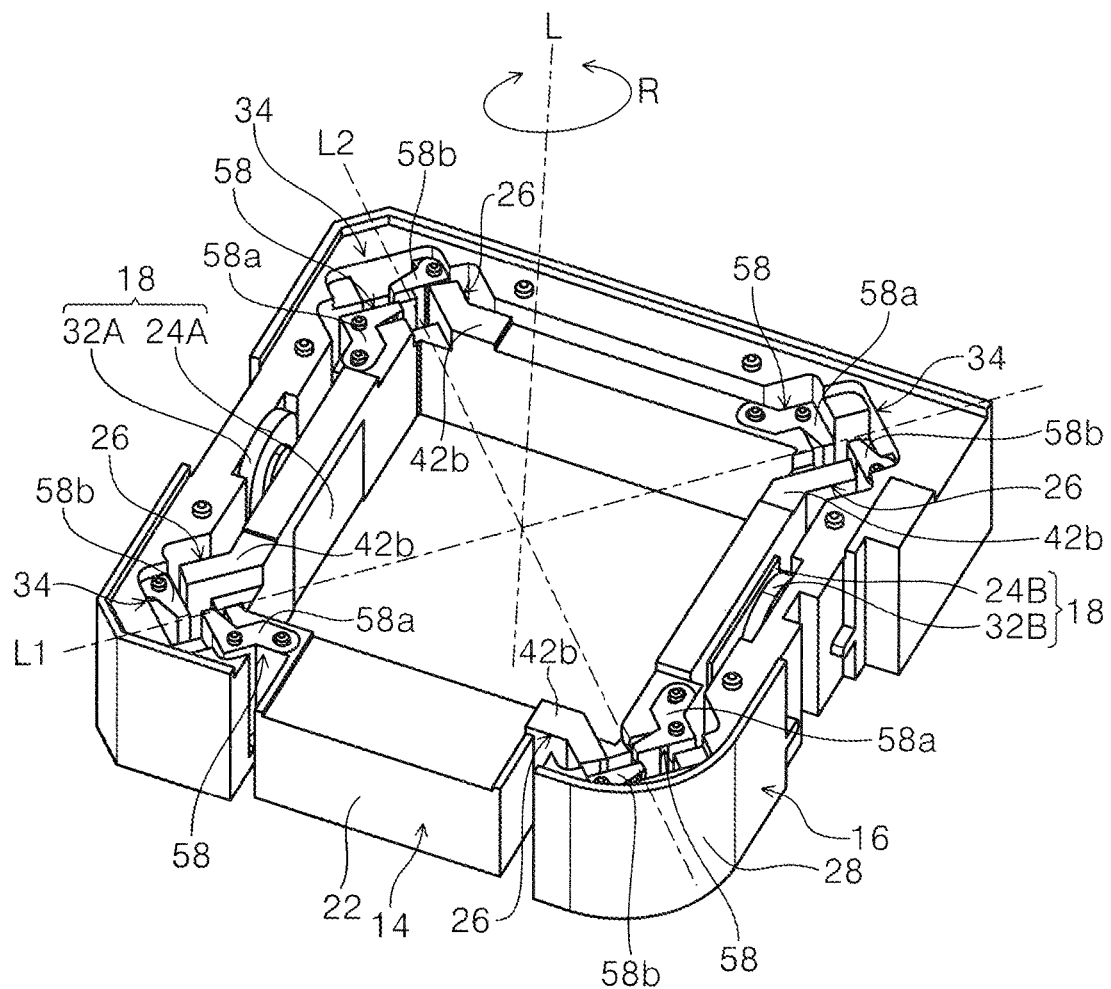
FIG. 14 is a perspective view showing a relationship between a movable body and a fixed body in an optical unit in accordance with a fourth embodiment.

A fourth embodiment of the optical unit 10 will be described below with reference to FIG. 14 and FIG. 15. The fourth embodiment differs from the first embodiment through the third embodiment in a shape of an elastic member 58. Structures other than the elastic member 58 are similar to the first embodiment.

Figure 15:
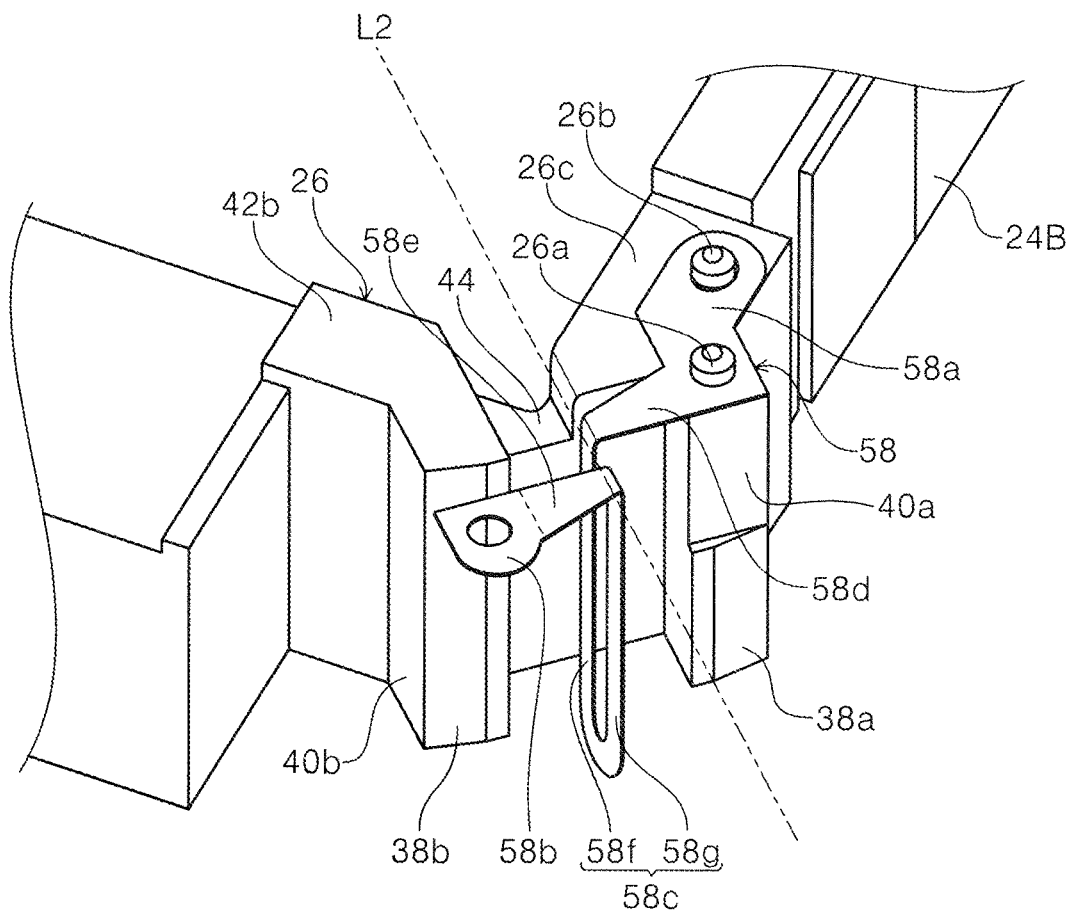
FIG. 15 is a perspective view showing a rolling support mechanism in accordance with a fourth embodiment.

In FIG. 15, also in this embodiment, it is structured that one end part 58*a* of the elastic member 58 is attached to the protruded part 26 provided in each of four corners of the holder frame 22 and the other end part 58*b* is attached to the receiving part 34 of the fixed frame 28 not shown.

In FIG. 15, the elastic member 58 is provided with the one end part 58*a*, the other end part 58*b*, a first elastic part 58*c* and second elastic parts 58*d* and 58*e*. The first elastic part 58*c* is extended along the optical axis direction and is provided with a first portion 58*f* and a second portion 58*g*. The first portion 58*f* and the second portion 58*g* are, as an example, disposed with a space therebetween in the second axial line direction. In this embodiment, the first elastic part 58*c* is formed in a "U"-shape. A posture of the elastic member 58 in FIG. 15 shows one example, and a direction where the first portion 58*f* and the second portion 58*g* are spaced may be the first axial line direction. Further, in FIG. 15, the optical axis direction is set in the "Z"-axis direction.

In this embodiment, the second elastic part 58*d* is formed between the one end part 58*a* and the first portion 58*f* of the first elastic part 58*c*, and the second elastic part 58*e* is formed between the other end part 58*b* and the second portion 58*g* of the first elastic part 58*c*. Further, in the elastic member 58 in this embodiment, the one end part 58*a* is formed on one side and the other end part 58*b* is formed on the other side with the second axial line interposed therebetween.

Also in this embodiment, two second elastic parts 58*d* and 58*e* are formed in the elastic member 58 and thus, durability in the optical axis direction of the elastic member 58 can be enhanced and buckling of the second elastic parts 58*d* and 58*e* can be suppressed.

Fifth Embodiment

Figure 16A:
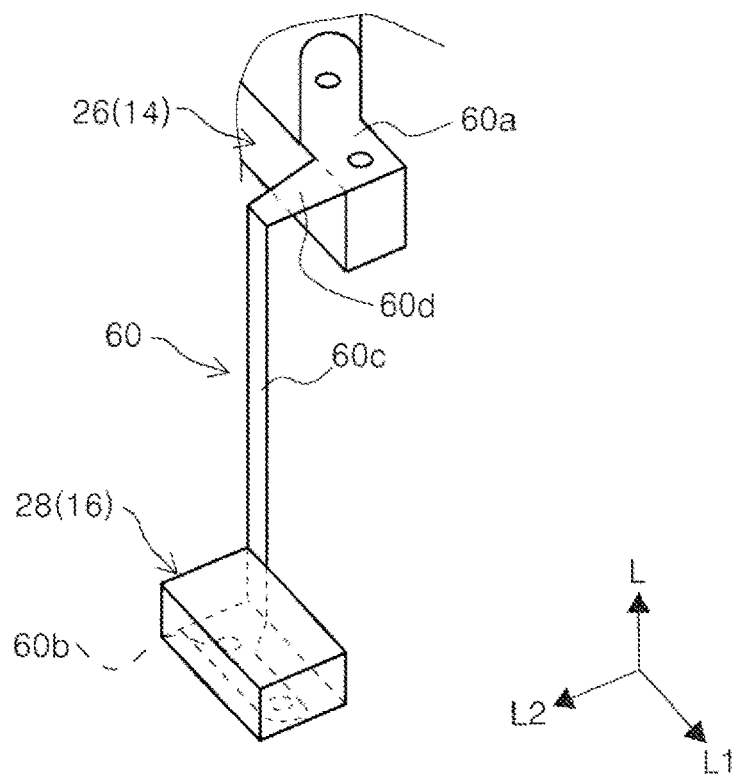
FIG. 16A is a perspective view showing an elastic member in accordance with a fifth embodiment.
Figure 16B:
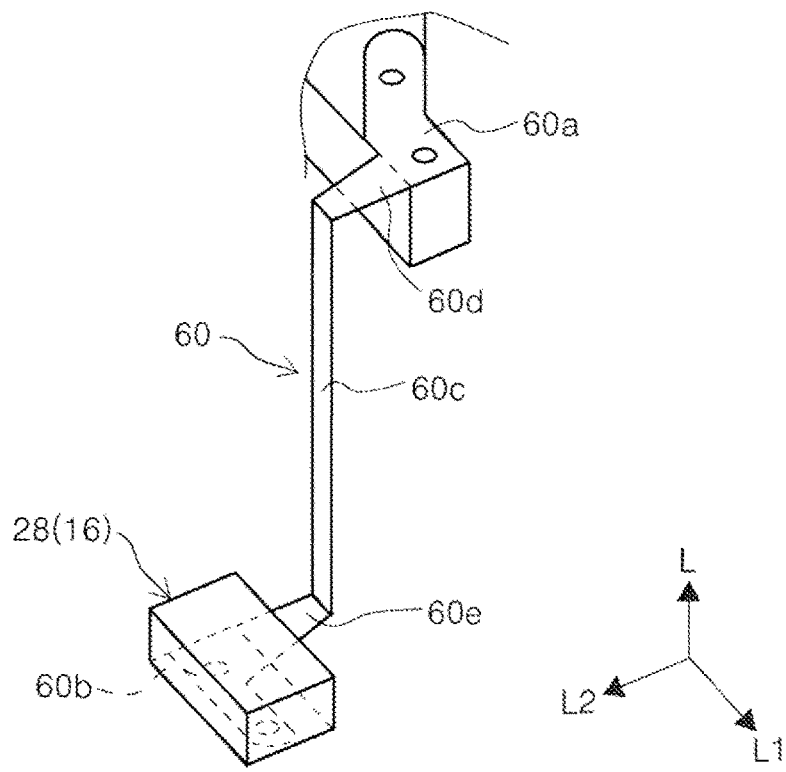
FIG. 16B is a perspective view showing an elastic member in accordance

A fifth embodiment will be described below with reference to FIG. 16A. In FIG. 16A and FIG. 16B, also in these embodiments, it is structured that one end part 60*a* of an elastic member 60 is attached to the protruded part 26 provided in each of four corners of the holder frame 22 and the other end part 60*b* is attached to the receiving part 34 of the fixed frame 28 not shown.

In FIG. 16A, the elastic member 60 is formed in an "I"-shape as a whole and is provided with one end part 60*a*, the other end part 60*b*, a first elastic part 60*c* and a second elastic part 60*d*. In this embodiment, one end of the second elastic part 60*d* is connected with the one end part 60*a* and the second elastic part 60*d* is extended in a direction intersecting the optical axis. The other end of the second elastic part 60*d* is connected with the first elastic part 60*c*. The first elastic part 60*c* is extended along the optical axis direction and its end part on the "−Z" direction side is connected with the other end part 60*b*.

In this embodiment, the one end part 60*a* and the other end part 60*b* of the elastic member 60 are, as an example, disposed on opposite sides to each other in the second axial line direction. Also in this embodiment, the elastic member 60 is provided with the first elastic part 60*c* which is structured to generate an elastic force in the direction "R" around the optical axis and the second elastic part 60*d* which is structured to generate an elastic force in the optical axis direction and thus, a structure of the shake restriction means in the optical unit 10 can be simplified. Further, in the elastic member 60, the first elastic part 60*c* is formed in an "I"-shape and thus, an occupation area of the elastic member 60 in the optical unit 10 can be reduced in a radial direction with the optical axis "L" as a center, and a size of the device can be reduced.

Modified Embodiment of Fifth Embodiment

In this embodiment, as shown in FIG. 16A, the second elastic part 60*d* is structured to dispose between the one end part 60*a* and the first elastic part 60*c*. However, instead of this structure, it may be structured that the second elastic part 60*d* is disposed between the other end part 60*b* and the first elastic part 60*c*. Further, as shown in FIG. 16B, it may be structured that two second elastic parts are provided by disposing the second elastic part 60*d* between the one end part 60*a* and the first elastic part 60*c* and by disposing a second elastic part 60*e* between the other end part 60*b* and the first elastic part 60*c*.

While the description above refers to particular embodiments of the present invention, it will be understood that many modifications may be made without departing from the spirit thereof. The accompanying claims are intended to cover such modifications as would fall within the true scope and spirit of the present invention.

The invention claimed is:

1. An optical unit comprising:
  a movable body comprising an optical module;
  a fixed body;
  a rolling support mechanism which turnably supports the movable body around an optical axis of the optical module with respect to the fixed body; and
  a rolling drive mechanism structured to turn the movable body around the optical axis;
  wherein the rolling support mechanism comprises:
    at least a pair of protruded parts which are protruded from one of the movable body and the fixed body toward an other of the movable body and the fixed body and are disposed at positions facing each other with the optical axis interposed therebetween in a direction intersecting the optical axis; and
    an elastic member whose one end part is attached to the protruded part and an other end part of the elastic member is attached to the other of the movable body and the fixed body, and the elastic member turnably supporting the movable body around the optical axis; and
  wherein at least the pair of the protruded parts restricts a shake of the movable body by contacting with the other of the movable body and the fixed body.

2. The optical unit according to claim 1, wherein
the elastic member is structured as a plate spring, and
the elastic member is disposed between the movable body and the fixed body so that a plate thickness direction of the plate spring is directed in a direction around the optical axis.

3. The optical unit according to claim 2, wherein
the elastic member comprises:
  a first portion which is extended in a direction of the optical axis; and
  a second portion which is disposed at a distance from the first portion in a direction intersecting the direction of the optical axis and is extended in the direction of the optical axis, and
the elastic member is formed in a "U"-shape.

4. The optical unit according to claim 3, wherein
the rolling support mechanism comprises a receiving part which receives the protruded part in the other of the movable body and the fixed body, and
when a direction passing the protruded part and the receiving part in a direction intersecting the optical axis is defined as a first axial line direction, and a direction intersecting the optical axis and the first axial line direction is defined as a second axial line direction, in the first axial line direction, the pair or the plurality of the protruded parts comprises a first restricted part, and the receiving part corresponding to the protruded part comprises a first restriction part at a distance from the first restricted part.

5. The optical unit according to claim 4, wherein
the first restricted part is formed in a shape in which a distance between the first restricted part and the first restriction part is widened from a center portion in the second axial line direction toward both end parts in the second axial line direction.

6. The optical unit according to claim 5, wherein
the first restricted part is formed in a shape along a turning locus of the movable body around the optical axis.

7. The optical unit according to claim 5, wherein
the first restricted part is formed in a shape along a tangent line with respect to a turning locus of the movable body around the optical axis.

8. The optical unit according to claim 4, wherein
a distance in the first axial line direction between the first restricted part and the first restriction part is smaller than a distance between the first portion and the second portion of the elastic member.

9. The optical unit according to claim 4, wherein
the protruded part comprises a second restricted part and the receiving part comprises a second restriction part at a distance from the second restricted part in the second axial line direction.

10. The optical unit according to claim 9, wherein
two pairs of the second restricted parts and the second restriction parts are provided so as to be disposed with a space therebetween in the second axial line direction.

11. The optical unit according to claim 9, wherein
at least a part of the first portion and the second portion of the elastic member is disposed in the receiving part,
the receiving part is formed with an elastic member facing part which faces the first portion and the second portion at a distance from the first portion and the second portion in the second axial line direction, and
a distance between the second restricted part and the second restriction part is smaller than a distance between the first portion and the second portion and the elastic member facing part in the second axial line direction.

12. The optical unit according to claim 4, wherein
the movable body comprises at least one third restricted part in the optical axis direction, and
the fixed body comprises a third restriction part at a distance from the third restricted part.

13. The optical unit according to claim 12, wherein
the third restricted part is provided in the protruded part.

14. The optical unit according to claim 1, wherein
the optical module comprises a shake correction mechanism for a pitching direction and a yawing direction.

15. An optical unit comprising:
a movable body comprising an optical module;
a fixed body;
a rolling support mechanism which turnably supports the movable body around an optical axis of the optical module with respect to the fixed body; and
a rolling drive mechanism structured to turn the movable body around the optical axis;
wherein the rolling support mechanism comprises:
  a plurality of protruded parts which are protruded from one of the movable body and the fixed body toward an other of the movable body and the fixed body and are disposed at rotationally symmetrical positions at equal intervals in a direction around the optical axis; and
  an elastic member whose one end part is attached to the protruded part and an other end part of the elastic member is attached to the other of the movable body and the fixed body, and the elastic member turnably supporting the movable body around the optical axis; and
wherein the protruded part restricts a shake of the movable body by contacting with the other of the movable body and the fixed body.

* * * * *